United States Patent [19]
Kobayashi et al.

[11] Patent Number: 5,275,388
[45] Date of Patent: Jan. 4, 1994

[54] VIBRATION CONTROL SYSTEM

[75] Inventors: Toshiaki Kobayashi; Hidetaka Ozawa; Masaki Ueyama, all of Wako, Japan

[73] Assignee: Honda Giken Kogyo Kabushiki Kaisha, Tokyo, Japan

[21] Appl. No.: 981,017

[22] Filed: Nov. 24, 1992

[30] Foreign Application Priority Data

Nov. 26, 1991 [JP] Japan .................. 3-336197
Apr. 3, 1992 [JP] Japan .................. 4-110803

[51] Int. Cl.[5] ............................................. F16M 3/00
[52] U.S. Cl. ............................ 267/140.14; 248/550
[58] Field of Search ...................... 248/550, 638; 267/140.14, 140.15; 188/267

[56] References Cited

U.S. PATENT DOCUMENTS

| | | | |
|---|---|---|---|
| 4,314,623 | 2/1982 | Kurokawa | 188/267 |
| 4,624,435 | 11/1986 | Freudenberg | 188/267 X |
| 4,669,711 | 6/1987 | Beer | 188/267 X |
| 4,679,775 | 7/1987 | Funaki et al. | 188/267 X |
| 4,699,348 | 10/1987 | Freudenberg | 188/267 X |
| 4,725,046 | 2/1988 | Sugino | 188/267 X |
| 4,869,474 | 9/1989 | Best et al. | 267/140.14 X |
| 4,893,800 | 1/1990 | Tabata | 267/140.14 |
| 4,974,706 | 12/1990 | Maji et al. | 188/267 |

FOREIGN PATENT DOCUMENTS 59-23139 2/1984 Japan .
59-65640 4/1984 Japan .

*Primary Examiner*—Ramon O. Ramirez
*Attorney, Agent, or Firm*—Lyon & Lyon

[57] ABSTRACT

A vibration control system controls transmission of vibrations from a vibration source to a base. The vibration control system comprises a vibration control assembly. The vibration control assembly has a bracket fixed to the vibration source, a pair of driving members holding the bracket therebetween and deformable or displaceable in opposite directions and by substantially the same amount in response to at least one control signal corresponding to the vibrations from the vibration source, one of the driving members being arranged between the bracket and the base, and a bolt securing the bracket and the driving members to the base.

12 Claims, 18 Drawing Sheets

FIG.4a ENGINE VIBRATION
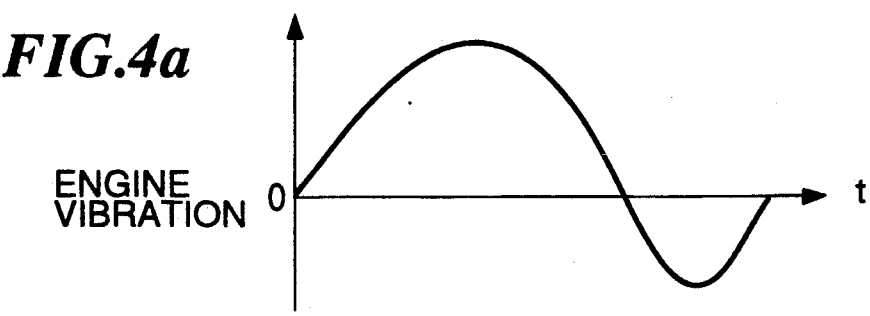
FIG.4b ELECTRIC CURRENT
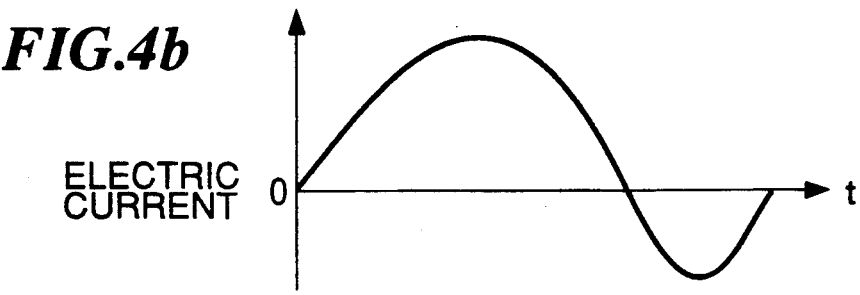
FIG.4c MAGNETIC FIELD
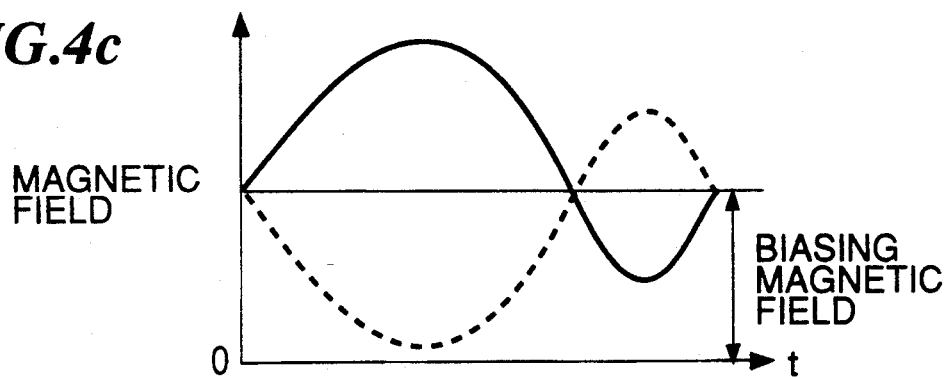
FIG.4d MAGNETIC FLUX DENSITY
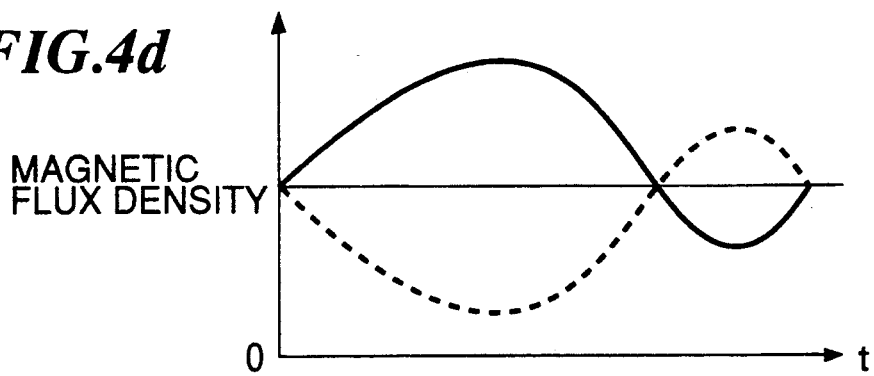
FIG.4e DEFORMATION
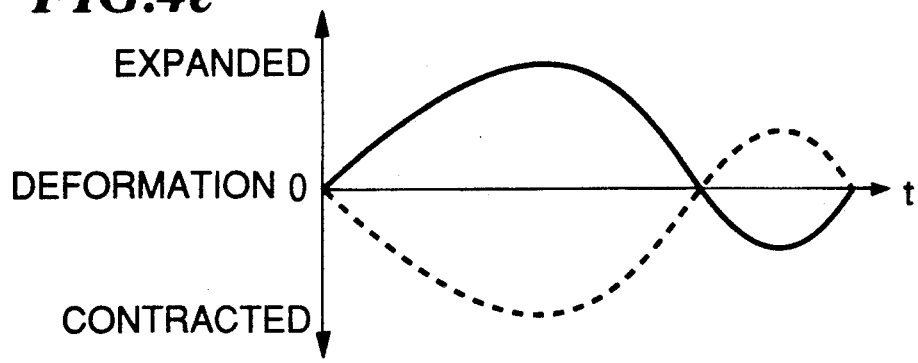

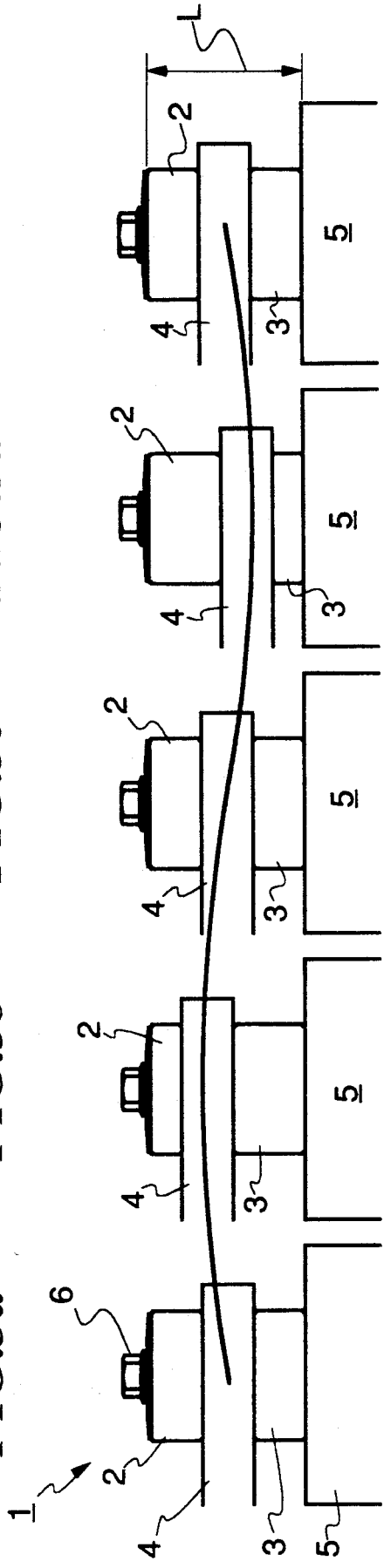

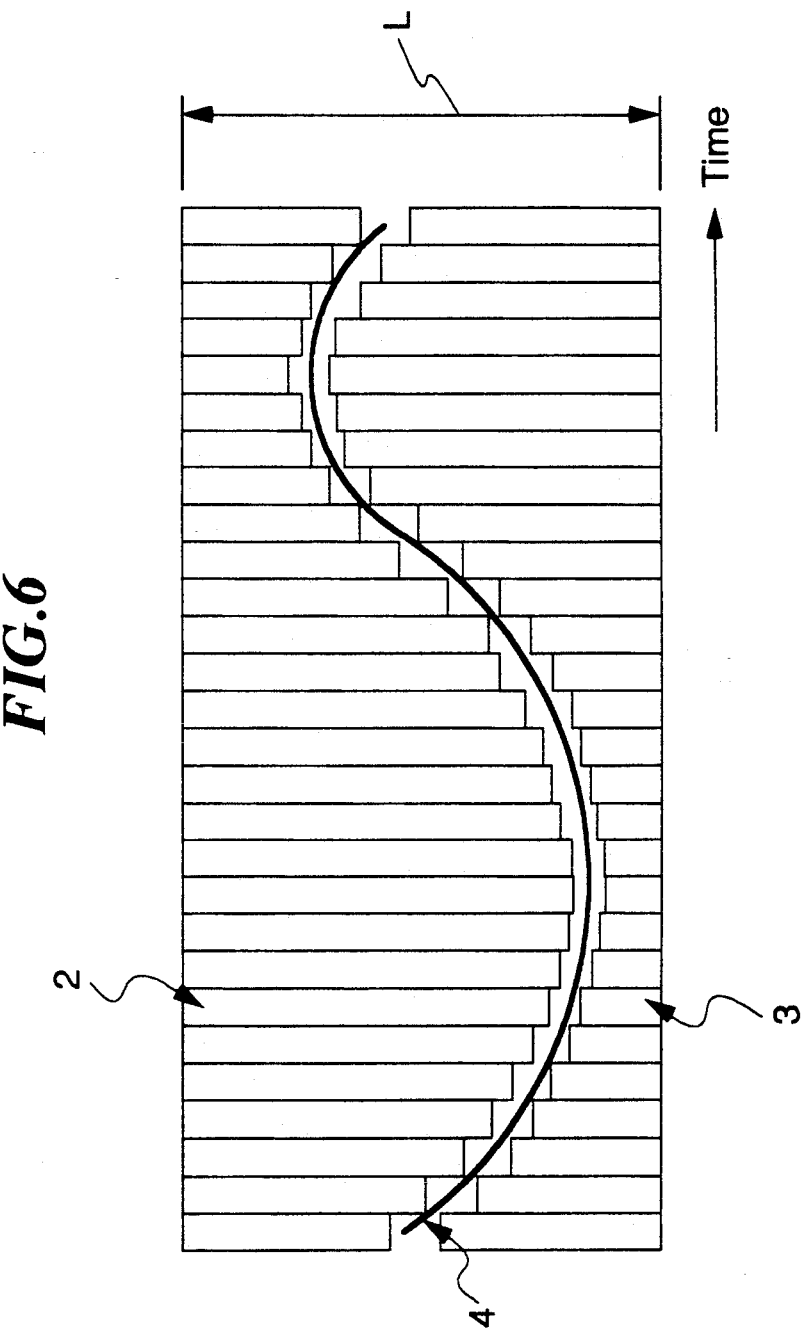

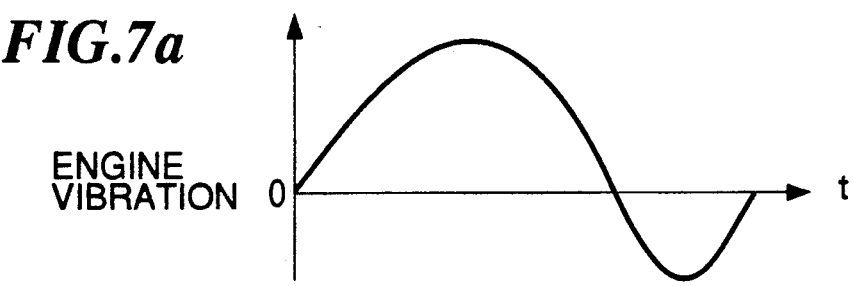
FIG.7a ENGINE VIBRATION
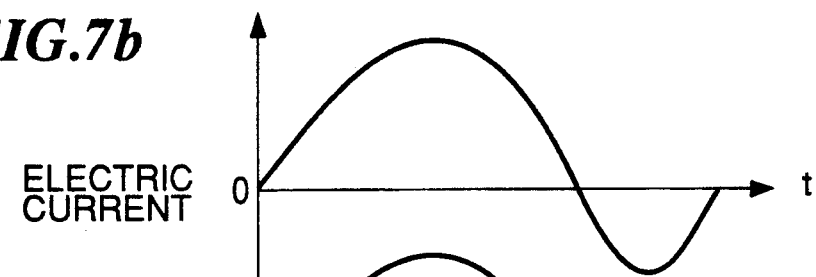
FIG.7b ELECTRIC CURRENT
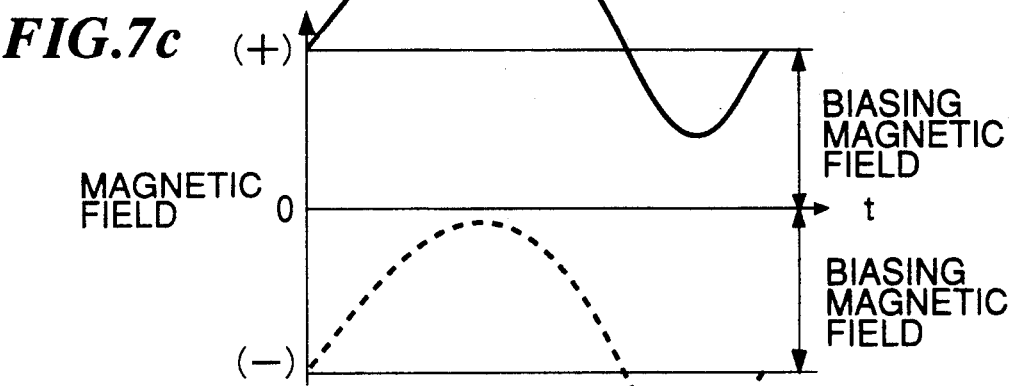
FIG.7c MAGNETIC FIELD — BIASING MAGNETIC FIELD
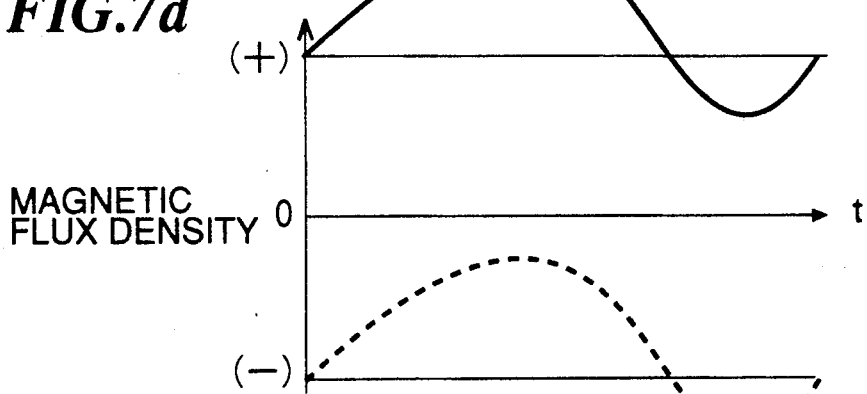
FIG.7d MAGNETIC FLUX DENSITY
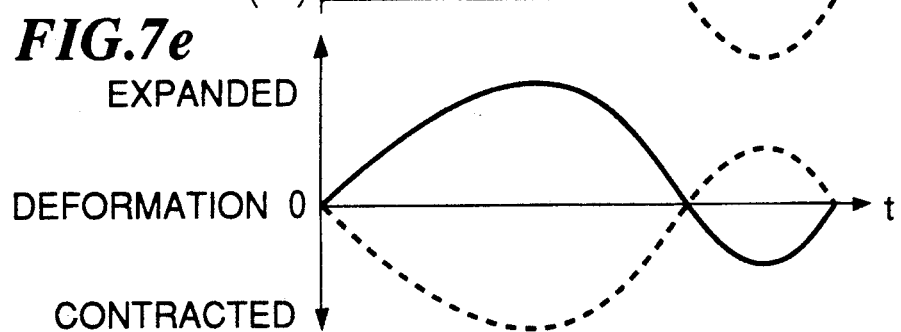
FIG.7e EXPANDED DEFORMATION CONTRACTED

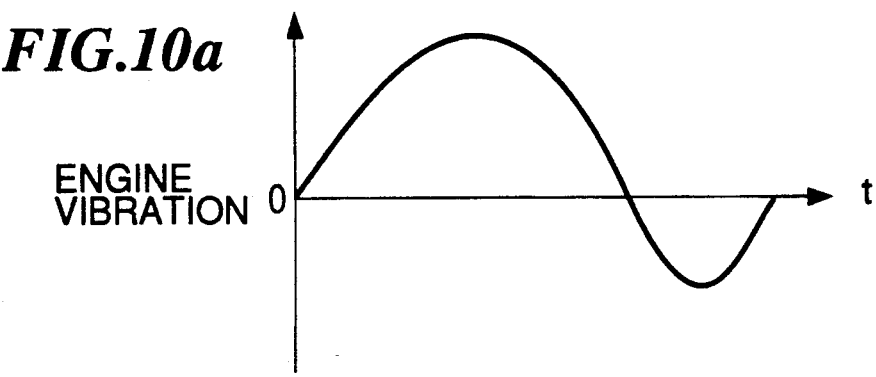
FIG.10a ENGINE VIBRATION
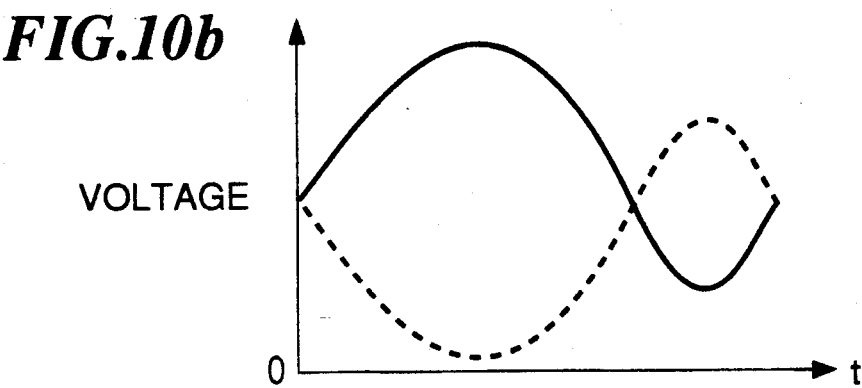
FIG.10b VOLTAGE
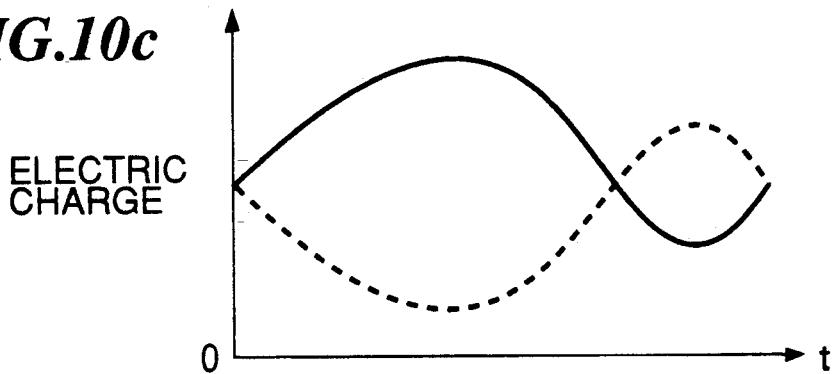
FIG.10c ELECTRIC CHARGE
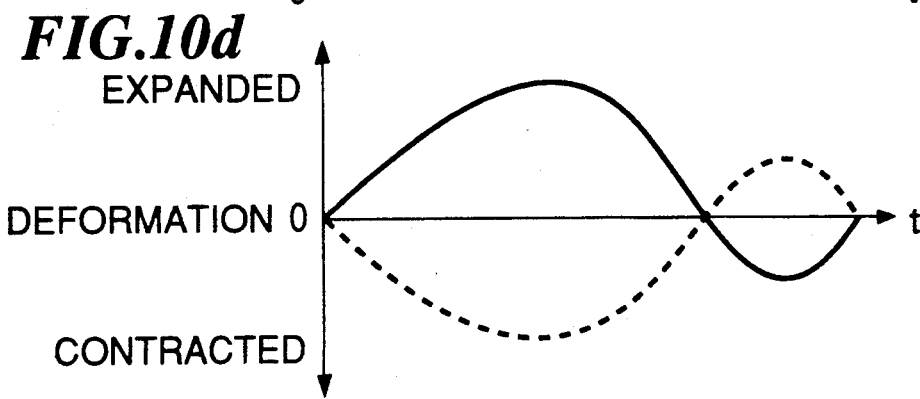
FIG.10d EXPANDED DEFORMATION CONTRACTED

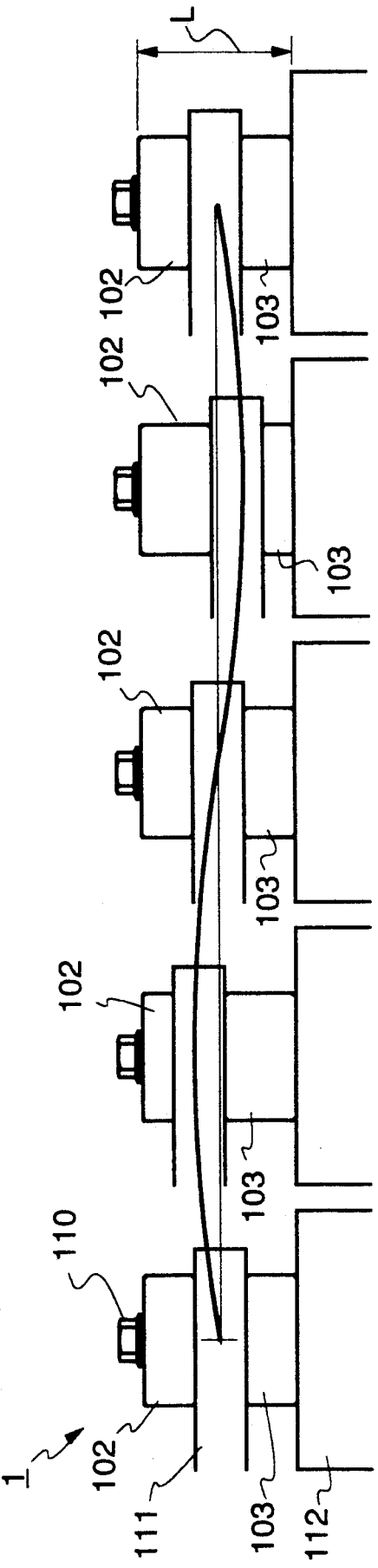

VIBRATION CONTROL SYSTEM

BACKGROUND OF THE INVENTION

1. Field of the Invention

This invention relates to a vibration control system for controlling transmission of vibrations from a vibration source, such as an engine, to a base supporting the vibration source.

2. Prior Art

Conventionally, a vibration control system of this kind has been proposed, e.g. by Japanese Provisional Patent Publications (Kokai) Nos.59-23139 and 59-65640, which comprises a vibration control assembly having an electrostrictive element arranged across a vibration-transmitting path, to which is applied voltage varying in synchronism with a repetition cycle of vibrations transmitted via the path to thereby absorb the vibrations by causing electrostrictive strain of the electrostrictive element.

According to this prior art, however, the electrostrictive element per se can be very easily affected or even broken by the strain. To overcome this inconvenience, the vibration control assembly is constructed such that a pair of plates are arranged on both sides of the electrostrictive element and the plates are fastened by means of a bolt to apply a compressive force (i.e. axial tension of the bolt) on the element. However, the vibration control assembly with this construction suffers from a problem that load is repeatedly applied to the bolt with oscillatory displacement of the electrostrictive element, so that the bolt may be loosened or broken by fatigue, which makes it difficult or even impossible for the vibration control assembly to support the vibration source. On the other hand, if the axial tension of the bolt is too weak, the electrostrictive element may undergo pealing-off and hence the assembly may be broken, which makes it impossible to support the vibration source, whereas if the axial tension of the bolt is too strong, the displacement of the element is limited by the axial tension of the bolt, which prevents positive and accurate control of transmission of vibrations from the vibration source to the base on which the vibration source is supported.

SUMMARY OF THE INVENTION

It is a first object of the invention to provide a vibration control system which is capable of supporting a vibration source in such a secure manner as to prevent the vibration source from falling off, and controlling the transmission of vibrations from the vibration source to the base in a positive and accurate manner.

It is a second object of the invention to provide a vibration control system which has a vibration control assembly with a simplified construction, which allows displacement of driving members thereof through an increased stroke.

To attain the above objects, the present invention provides a vibration control system for controlling transmission of vibrations from a vibration source to a base. The vibration control system according to the invention is characterized by comprising:

a vibration control assembly having:

support means fixed to the vibration source;

a pair of driving members holding the support means therebetween and deformable or displaceable in opposite directions and by substantially the same amount in response to at least one control signal corresponding to the vibrations from the vibration source, one of the driving members being arranged between the support means and the base; and fastening means securing the support means and the driving members to the base; and control means for supplying the control signal to the driving members.

In one preferred form of the invention, the driving members each comprise a magnetostrictive element, a coil wound around the magnetostrictive element, and a permanent magnet placing the magnetostrictive element in a biasing magnetic field, the direction of winding of the coil of one of the driving members being opposite to that of winding of the coil of the other driving member, the direction of the biasing magnetic field generated by the permanent magnet of the one driving member being opposite to that of the biasing magnetic field generated by the permanent magnet of the other driving member, the control means supplying the coils with control currents having substantially the same magnitude, as the at least one control signal.

In another preferred form of the invention, the driving members each comprise a magnetostrictive element, a coil wound around the magnetostrictive element, and a permanent magnet placing the magnetostrictive element in a biasing magnetic field, the direction of winding of the coil of one the driving members being identical to that of winding of the coil of the other driving member, the direction of the biasing magnetic field generated by the permanent magnet of the one driving member is identical to that of the biasing magnetic field generated by the permanent magnet of the other driving member, the control means supplying the coils with control currents having substantially the same magnitude as the at least one control signal.

In another preferred form of the invention, the driving members each comprise an electrostrictive element, the electrostrictive element being supplied with a control voltage as the at least one control signal, the control voltage applied to one of the electrostrictive elements having the same absolute value with and being opposite in phase to the control voltage applied to the other electrostrictive element, the control means previously applying a biasing charge to each of the electrostrictive elements before supplying the control voltage thereto.

Preferably, the electrostrictive element is formed of a laminate of electrostrictive elements.

In another preferred form of the invention, the driving members each comprise a negative-magnetostrictive element having a characteristic that is contracts when placed in an magnetic field, a pair of magnetic members holding the negative-magnetostrictive element therebetween, and a coil wound around the negative-magnetostrictive element, the control means supplying the coils with respective control currents, as the at least one control signal, separately from each other.

Preferably, the coils are alternately supplied with the respective control currents per one cycle of a waveform of the vibrations from the vibration source.

More preferably, one of the magnetic members is formed by a portion of the support means.

Further preferably, one of the magnetic members is formed by a portion of the base.

The above and other objects, features, and advantages of the invention will become more apparent from the ensuing detailed description taken in conjunction with the accompanying drawings.

BRIEF DESCRIPTION OF THE DRAWINGS

FIGS. 4a to 4e collectively form a timing chart in which:

FIG. 4a shows a waveform of a vibration of an engine transmitted to the vibration control assembly according to the first embodiment;

FIG. 4b shows a waveform of a control current supplied to the vibration control assembly;

FIG. 4c shows a variation in the intensity of the magnetic field generated by the vibration control assembly;

FIG. 4d shows a variation in the magnetic flux density of the magnetic field; and FIG. 4e shows a manners of displacement of a pair of driving members of the vibration control assembly;

FIGS. 5a to 5e are diagrams which are useful in explaining a manner of operation of the vibration control assembly shown in FIG. 1;

FIG. 6 is another diagram which is useful in explaining the manner of operation of the vibration control assembly shown in FIG. 1;

FIGS. 7a to 7e collectively form a timing chart in which:

FIG. 7a shows a waveform of a vibration of an engine transmitted to the vibration control assembly of a vibration control system according to a second embodiment of the invention;

FIG. 7b shows a waveform of a control current supplied to the vibration control assembly;

FIG. 7c shows a variation in the intensity of the magnetic field generated by the vibration control assembly;

FIG. 7d shows a variation in the magnetic flux density of the magnetic field; and FIG. 7e shows manners of displacement of a pair of driving members of the vibration control assembly;

FIGS. 10a to 10d collectively form a timing chart in which:

FIG. 10a shows a waveform of a vibration of an engine transmitted to the vibration control assembly according to the third embodiment;

FIG. 10b shows a waveform of a control voltage applied to the vibration control assembly;

FIG. 10c shows a variation in the electric charge accumulated in the vibration control assembly; and FIG. 10d shows manners of displacement of a pair of driving members of the vibration control assembly;

FIGS. 13a and 13b collectively form a timing chart in which:

FIG. 13a shows a waveform of a control current supplied to one of the coils appearing in FIG. 11; and FIG. 13b shows a waveform of a control current supplied to the other of the coils appearing in FIG. 11;

FIGS. 14a and 14b collectively form a timing chart in which:

FIG. 14a shows variations in magnetic flux density generated by the coils in FIG. 11; and FIG. 14b shows displacement of driving members comprised of negative-magnetostrictive elements;

FIGS. 15a to 15e are diagrams similar to FIGS. 5a to 5e, are useful in explaining a manner of operation of the vibration control assembly shown in FIG. 11;

DETAILED DESCRIPTION

The invention will now be described in detail with reference to drawings showing embodiments thereof.

Figure 1:
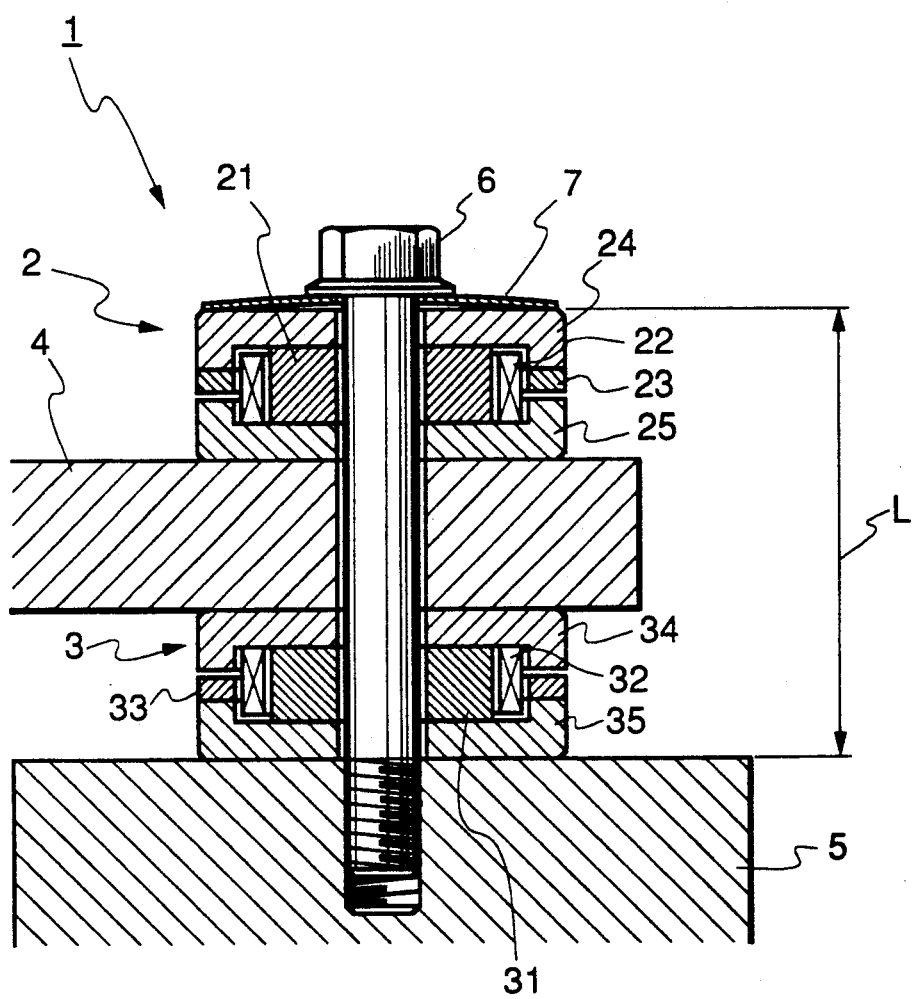
FIG. 1 is a longitudinal cross-sectional view showing a vibration control assembly of a vibration control system according to a first embodiment of the invention.

Referring first to FIG. 1 there is shown a vibration control assembly of a vibration control system according to a first embodiment of the invention. The vibration control system is used in an automotive vehicle for controlling vibrations from a vehicle engine to a chassis of the vehicle. In the figure, reference numeral 1 designates the vibration control assembly in the form of an engine mount holding an engine, not shown, onto a chassis of an automotive vehicle on which the engine is installed. The engine mount controls the transmission of vibrations from the engine to the vehicle chassis.

As shown in FIG. 1, the vibration control assembly 1 comprises a pair of upper and lower driving members 2, 3 which expand and contract in such a manner that when one of them expands, the other contracts to the same extent as the former at the same time, and when the former contracts, the latter expands to the same extent as the former at the same time, in response to a control signal supplied thereto from external control means responsive to vibrations from the engine. The driving members 2, 3 are arranged such that they hold therebetween a bracket (support means) 4 fixed to the engine for supporting the engine, and the lower driving member 3 is located between the bracket 4 and a base 5 fixed to the vehicle chassis. The upper and lower driving members 2, 3 and the bracket 4 are secured to the base 5 by a bolt (fastening means) 6 extending through the driving members 2, 3 and the bracket 4. A dished member 7 is interposed between the head of the bolt 6 and an upper end face of the upper driving member 2 for allowing pressure to be evenly applied to the upper end face of the upper driving member 2. The dished member 7 is pressed downward by the head of the bolt 6 to apply a compressive force to the upper and lower driving members. In the present embodiment, the lower driving member 3 located between the bracket 4 and the base 5 is controlled to expand and contract in the same phase with the vibration of the engine. More specifically, when the bracket 4 is displaced upward to increase the distance between the bracket 4 and the base 5 due to vibration of the engine, the lower driving member 3 expands, whereas when the bracket 4 is displaced downward to decrease the distance, it contracts.

Figure 2:
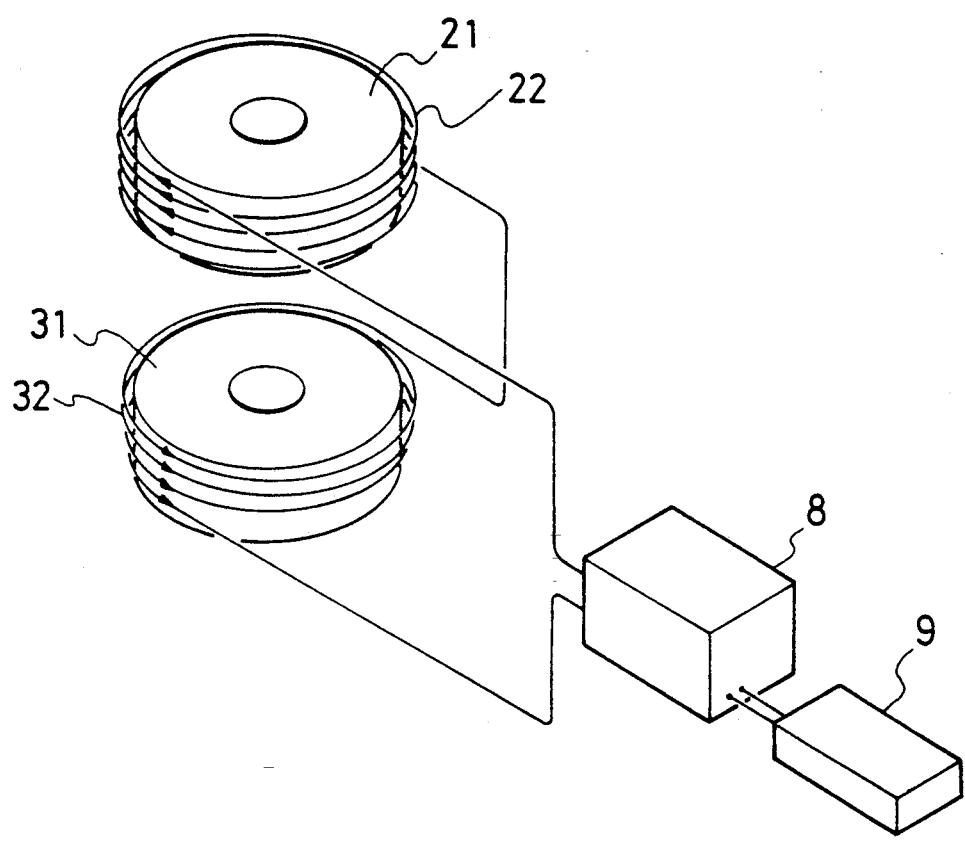
FIG. 2 is a perspective schematic exploded view showing the vibration control system, useful in explaining a manner of connection between coils wound around a pair of magnetostrictive elements and a power supply.

The upper and lower driving members 2, 3 are comprised of magnetostrictive elements 21, 31, coils 22, 32 wound around the elements 21, 31, permanent magnets 23, 33 placing the elements 21, 31 in biasing magnetic fields, and upper casings and lower casings 24, 34, 25, 35 cooperatively forming magnetic circuits. The direction of winding of the coil 22 of the upper driving member 2 is opposite to that of the coil 32 of the lower driving member 3, as shown in FIG. 2. The biasing magnetic fields generated by the permanent magnets 23, 33 have the same direction and intensity. The intensity of the biasing magnetic fields is set to such a value as to cause the magnetostrictive elements 21, 31 to be resiliently deformed to approximately half the maximum elastic deformation (the maximum elongation) of the elements 21, 31. Thus, the magnetostrictive elements 21, 31 can be expanded or contracted from reference positions to which they are normally resiliently deformed by the biasing magnetic fields generated by the permanent magnets 23, 33.

The coils 22, 32 of the upper and lower driving members 2, 3 having the above construction are supplied from a common power supply 8 with control currents (FIG. 4b) having substantially the same waveform as that of the engine vibration (FIG. 4a) to generate magnetic fields having the same intensity commensurate with the control currents supplied thereto and opposite directions, whereby the magnetostrictive elements 21, 31, are displaced in opposite manners, i.e. one expands when the other contracts, while the former contracts when the latter expands, to the same degree from the aforementioned reference positions. In this connection, the displacement of the magnetostrictive elements 21, 31 in a direction expanding from the respective reference positions is defined as a positive displacement, whereas the displacement of same in a direction contracting from the respective reference positions is defined as a negative displacement, throughout the specification.

The power supply 8 is controlled by a controller 9 so as to supply the control currents (FIG. 4b) having substantially the same waveform as the engine vibration (FIG. 4a) to the coils 22, 32. The controller 9 is provided with first and second comparator circuits 91, 92, shown in FIG. 3, referred to hereinafter.

Figure 3:
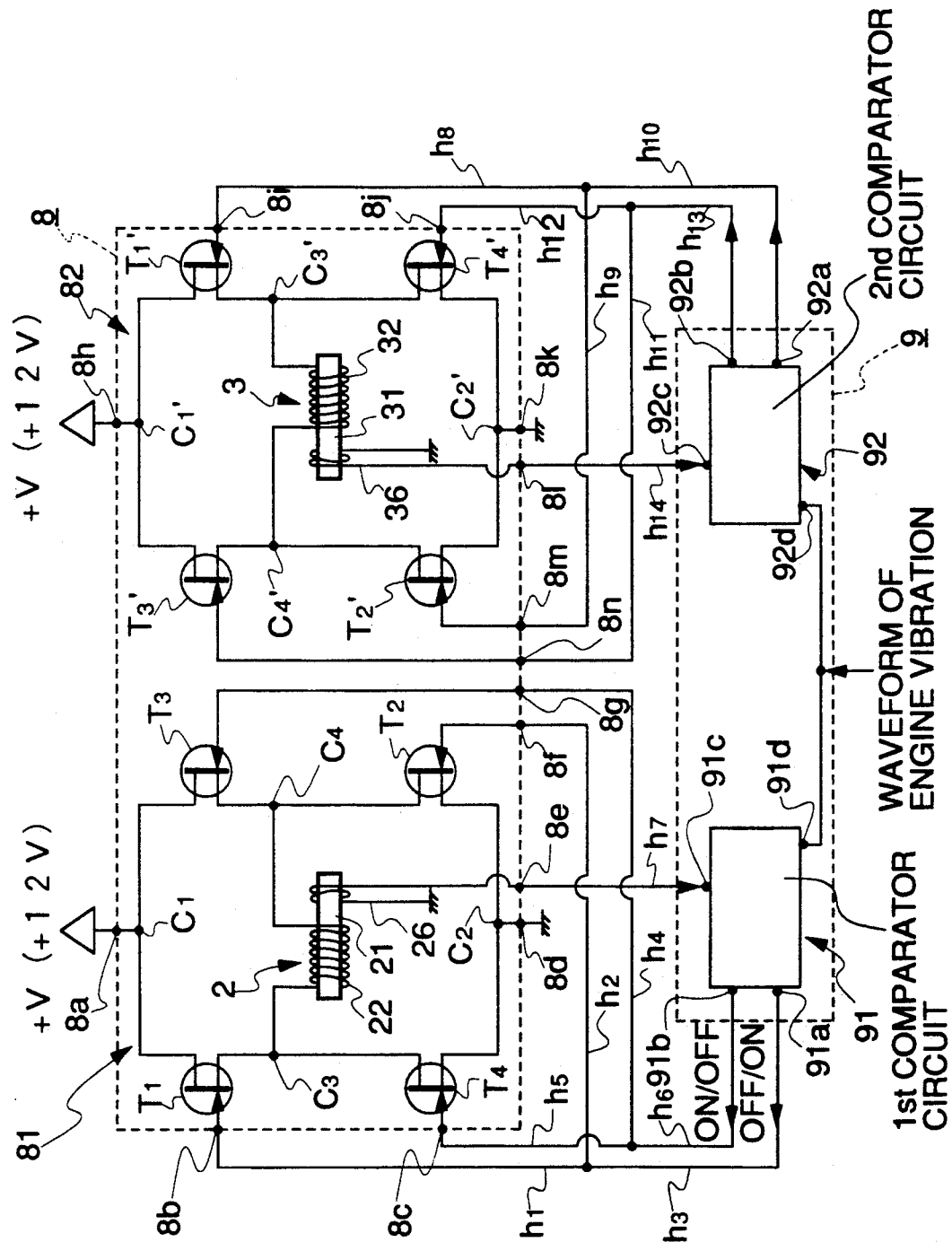
FIG. 3 is a circuit diagram showing the power supply and a controller.

As shown in FIG. 3, the power supply 8 comprises first and second power supply circuits 81, 82, and external terminals 8a to 8n. The first power supply circuit 81 is formed of four switching transistors $T_1$ to $T_4$. Sources of the transistor $T_1$ and the transistor $T_3$ are connected to each other at a junction $C_1$, which in turn is connected via the external terminal 8a to the positive side of a storage battery, not shown, installed on the vehicle. Drains of the transistor $T_2$ and the transistor $T_4$ are connected to each other at a junction $C_2$, which in turn is grounded via the external terminal 8d. A drain of the transistor $T_1$ and a source of the transistor $T_4$ are connected to each other at a junction $C_3$, while a drain of the transistor $T_3$ and a source of the transistor $T_2$ at a junction $C_4$. The junctions $C_3$ and $C_4$ are connected to one end and the other end of the coil 22 of the upper driving member 2, respectively. A magnetic flux-detecting coil 26 is wound around the magnetostrictive element 21 of the upper driving member 2 in the same direction as the coil 22 for detecting the magnetic flux generated by the coil 22. One end of the detecting coil 26 is grounded, while the other end of same is connected to the external terminal 8e. Gates of the transistors $T_1$ and $T_2$ are connected to the external terminals 8b and 8f, respectively, which in turn are connected to an output terminal 91a of the first comparator circuit 91 via a line $h_1$, a line $h_1$, and an output circuit, not shown, of the controller 9, and via a line $h_2$, the line $h_3$, and the output circuit of the controller 9, respectively. Gates of the transistors $T_3$ and $T_4$ are connected to the external terminals 8g and 8c, respectively, which in turn are connected to an output terminal 91b of the first comparator circuit 91 via a line $h_4$, a line $h_6$, and the output circuit of the controller 9, and via a line $h_5$, the line $h_6$, and the output circuit of the controller 9, respectively. The external terminal 8e is connected to an input terminal 91c of the comparator circuit 91 via a line h; and an input circuit, not shown, of the controller 9.

The second power supply circuit 82 has a construction similar to that of the first power supply circuit 81. More specifically, it has four switching transistors $T_1'$ to $T_4'$ connected to each other in the same manner as those of the first power supply circuit 81. It has a junction $C_1'$ connected to the positive side of the storage battery of the vehicle via the external terminal 8h, and a junction $C_2'$ grounded via the external terminal 8k. It also has junctions $C_3'$ and $C_4'$ connected to one end and the other end of the coil 32 of the lower driving member 3, respectively. A magnetic flux-detecting coil 36 is also wound around the magnetostrictive element 31 in the same direction as the coil 32 for detecting the magnetic flux generated by the coil 32. The detecting coil 36 has one end thereof grounded, and the other end thereof connected to the external terminal 8l. Gates of the transistors $T_1'$ and $T_2'$ are connected to the external terminals 8i and 8m, respectively, which in turn are connected to an output terminal 92a of the second comparator circuit 92 via a line $h_8$, a line $h_{10}$, and the output circuit of the controller 9, and via a line $h_9$, the line $h_{10}$, and the output circuit of the controller 9, respectively. Gates of the transistors $T_3$ and $T_4$ are connected to the external terminals 8n and 8j, respectively, which in turn are connected to an output terminal 92b of the second comparator circuit 92 via a line $h_{11}$, a line $h_{13}$, and the output circuit of the controller 9, and via a line $h_{12}$, the line $h_{13}$, and the output circuit of the controller 9, respectively. The external terminal 8l is connected to an input terminal 92c of the second comparator circuit 92 via a line $h_{14}$ and the input circuit of the controller 9.

The first and second comparator circuits 91 and 92 have input terminals 91d and 92d by way of which a reference signal indicative of the waveform of the engine vibration (FIG. 4a) synchronous with the rotation of the engine is supplied via the output circuit of the controller 9 to the comparator circuits 91, 92. Responsive to the reference signal, the comparator circuits 91 and 92 output ON-OFF control signals in the following manner: Since the magnetostrictive elements 21, 31 are displaced from the respective reference positions thereof by amounts proportional to the magnetic fluxes generated by the coils 22, 32, the magnetic fluxes are calculated based on the induced current flowing through the detecting coils 26, 36, and then the phase and amplitude of each of the control currents (FIG. 4b) calculated based on the thus-calculated magnetic fluxes are compared with the phase and amplitude of the reference signal, whereby the ON-OFF pulse signals are supplied from the comparator circuits 91 and 92 via the output terminals 91a, 91b, 92a, 92b, and pulse-width-modulation (PWM) control is effected by the transistors $T_1$ to $T_4$ and $T_1'$ to $T_4'$ according to the pulse widths of the ON-OFF pulse signals so as to make the waveforms of the control currents equal to the waveform of the reference signal. In other words, as the pulse duration of each of the pulse signals from the output terminals 91a, 92b of the comparator circuits 91, 92 increases, the amount of a corresponding one of electric currents flowing from the junctions $C_3$, $C_3'$ toward the junctions $C_4$, $C_4'$ increases, thereby increasing the amounts of electric currents flowing through the coils 22, 32, whereas as the pulse duration of each of the pulse signals from the output terminals from the output terminals 91b, 92b increases, the amount of the corresponding one of the electric currents flowing from the junctions $C_4$, $C_4'$ toward the junctions $C_3$, $C_3'$ increases, thereby decreasing the amounts of electric currents flowing through the coils 22, 32.

Thus, the transistors $T_1$ to $T_4$ and $T_1'$ to $T_4'$ of the power supply circuits 81, 82 effect PWM control in response to the ON-OFF pulse signals from the comparator circuits 91, 92, to supply the control currents (FIG. 4b) having substantially the same waveform as that of the engine vibration from the power supply circuits 81, 82 to the coils 22, 32 of the driving members 2, 3.

The invention is thus implemented in the first embodiment so that the control currents corresponding to the engine vibration are supplied to the coils 22, 32 of the driving members 2, 3 whereby the magnetostrictive element 21 of the upper driving member 2 is caused to expand and contract in opposite phase but with the same amplitude with the waveform of the engine vibration, and at the same time the magnetostrictive element 31 of the lower driving member 31 is caused to expand and contract in the same phase and with the same amplitude as the waveform of the engine vibration.

Next, the operation of the vibration control system according to the first embodiment will be described:

When the reference signal having a waveform indicative of the waveform of the engine vibration (FIG. 4a) is supplied through the input terminals 91d, 92d to the comparator circuits 91, 92 of the controller 9, the aforementioned PWM control is effected to supply the control currents having a waveform which is substantially identical to that of the engine vibration (FIG. 4b) to the coils 22, 32 of the upper and lower driving members 2, 3 from the power supply circuits 82 81, respectively.

When the coils 22, 32 of the driving members 2, 3 are energized by these control currents substantially identical to each other, the magnetic field generated by the coil 22 of the upper driving member 2 varies as indicated by the broken line in FIG. 4c with reference to the biasing magnetic field generated by the permanent magnet 23, whereas the magnetic field generated by the coil 32 of the lower driving member 3, which is wound around the magnetostrictive element 31 in the opposite direction to that of the coil 22 varies as indicated by the solid line in FIG. 4c with reference to the biasing magnetic field generated by the permanent magnet 33. Accordingly, the magnetic flux density in the vicinity of the coil 22 and that in the vicinity of the coil 32 vary as indicated by the broken line and the solid line in FIG. 4d, respectively.

As the magnetic fields generated by the coils 22, 32 of the driving members 2, 3 vary in the above-mentioned manners, the magnetostrictive element 21 of the upper driving member 2 expands and contracts in the opposite phase and with the same amplitude with the control signal supplied to the coil 22 as indicated by the broken line in FIG. 4e, whereas the magnetostrictive element 31 of the lower driving member 3 expands and contracts in the same phase and with the same amplitude as the control signal supplied to the coil 32 as indicated by the solid line in FIG. 4e. That is, the magnetostrictive element 31 of the lower driving member 3 arranged between the bracket 4 and the base 5 expands and contracts in the same direction and by the same amount as the displacement of the bracket 4 caused by the engine vibration, whereas the magnetostrictive element 21 of the upper driving member 2 expands and contracts in the opposite manner to that of the magnetostrictive element 31 of the lower driving member 3.

The magnetostrictive element 31 of the lower driving member 3 expands and contracts in the same direction and by the same amount as the displacement of the bracket 4 caused by the engine vibration, in other words, the magnetostrictive element 31 expands as the distance between the bracket 4 and the base 5 increases due to upward displacement of the bracket 4, and the element 31 contracts as the above distance decreases due to the downward displacement of the bracket 4 (FIGS. 5a to 5e and FIG. 6), to vary the size of the lower driving member 3, i.e. the distance between the lower end face of the lower casing 35 and the upper end surface of the upper casing 34, which prevents the engine vibration from being transmitted from the bracket 4 (support means) fixed to the engine (vibration source) to the base 5 fixed to the chassis of the vehicle.

Further, the magnetostrictive element 21 of the upper driving member 2 and the magnetostrictive element 31 of the lower driving member 3 expand and contract in the opposite manners and to the same degree so as to compensate for expansion and contraction of their counterparts. That is, when the magnetostrictive element 31 expands, the magnetostrictive element 21 contracts to a degree matching the degree of expansion of the element 31, whereas when the former element 31 contracts, the latter element 21 expands to a degree matching the degree of contraction of the former element 31 (FIGS. 5a to 5e and FIG. 6). As a result, the total length L of the three members, i.e. the driving members 2, 3 and the bracket 4 always assumes the same value, which prevents the dished spring 7 and the bolt 6 from being exposed to repeated application of load. Therefore, it is possible to avoid loosening of the bolt 6 or breakage thereof due to fatigue, prolonging the life thereof, and hence positively hold the engine (vibration source) on the chassis of the vehicle. The fastening force of the bolt 6 is applied as a compressive force to the magnetostrictive elements 21, 31 via the dished member 7. Since the aforementioned total length L is constant, the fastening force of the bolt 6 is also constant, which inhibits the displacement of the magnetostrictive elements 21, 31 from being restricted by the compressive force, so that the magnetostrictive elements 21, 31 of the driving members 2, 3 can expand and contract without being adversely affected by the compressive force in response to the control currents supplied to the coils 22, 32. This enables positive and accurate control of the transmission of the engine vibration from the bracket 4 to the base 5.

Further, since the compressive force, which is obtained from the fastening force of the bolt 6, acts on the magnetostrictive elements 21, 31 of the driving members 2, 3, no stretching force acts on the elements 21, 31, so that peeling off or breakage of the elements 21, 31 is prevented, prolonging the life of the elements 21, 31.

Although the first embodiment described above employs the first and second comparator circuits 91, 92 provided in the controller 9, this is not limitative, but first and second adaptive control means may be used, which calculate magnetic fluxes from induced currents flowing through the detecting coils 26, 36, and continuously detect differences in the phase and amplitude between the displacement of the bracket 4 and the displacement of the magnetostrictive elements 21, 31, based on the magnetic fluxes calculated and the reference signal supplied through the input terminals 91d, 92d and having a waveform representative of the waveform of the engine vibration, whereupon ON-OFF pulse signals are supplied through the output terminals 91a, 91b, 92a, 92b to the power supply circuits 81, 82 so as to minimize the above differences. In this case as well, the transistors $T_1$ to $T_4$ and $T_1'$ to $T_4'$ of the power supply circuits 81, 82 effect PWM control according to the pulse width or duration of the ON-OFF pulse signals, whereby the magnetostrictive element 21 of the upper driving member 2 expands and contracts in opposite phase and with the same amplitude with the waveform of the engine vibration (i.e. the waveform of displacement of the bracket 4 caused by the engine vibration), and at the same time the magnetostrictive element 31 of the lower driving member 3 contracts and expands in the same phase and with the same amplitude as the waveform of the engine vibration.

Next, a second embodiment of the invention will be described with reference to FIGS. 7a to 7e.

The second embodiment is distinguished from the first embodiment described above in that the coils 22, 32 of the driving members 2, 3 are wound around the magnetostrictive elements 21, 31 in the same direction but the biasing magnetic fields are generated by the permanent magnets 23, 33 in directions opposite to each other (FIG. 7c), and at the same time, similarly to the first embodiment, control currents having substantially the same waveform (FIG. 7b) are supplied to the coils 22, 32 from the power supply circuits 81, 82. In this connection, the magnetostrictive elements have a characteristic that the amount of displacement of the elements depends on the absolute value of the intensity of a magnetic field in which it is placed but not on the direction of the magnetic flux of the field. Therefore, if such permanent magnets are provided as will generate biasing magnetic fields which are equal to each other in the absolute value of intensity thereof, in the second embodiment as well, the magnetostrictive elements 21, 31 are capable of expanding and contracting in opposite manners from respective predetermined reference positions set by the biasing magnetic fields, similarly to the first embodiment.

According to the second embodiment, when the reference signal representative of the waveform of the engine vibration as shown in FIG. 7a is supplied through the input terminals 91d, 92d to the first and second comparator circuits 91, 92 of the controller 9 shown in FIG. 3, the PWM control is effected in the same manner as described above with respect to the first embodiment, so that the control currents (FIG. 7b) having substantially the same waveform as that of the engine vibration (FIG. 7a) are supplied from the power supply circuit 81 to the coil 22 of the upper driving member 2, and from the power supply circuit 82 to the coil 32 of the lower driving member 3.

When the coils 22, 32 of the driving members 2, 3 are energized by such substantially identical control currents, the magnetic field generated by the coil 22 of the upper driving member 2 wound around the magnetostrictive element 21 varies as indicated by the broken line in FIG. 7c with reference to the biasing magnetic field generated to bias the magnetostrictive element 21 in a negative direction by the permanent 23, while the magnetic field generated by the coil 32 of the lower driving member 3 wound around the magnetostrictive element 31 in the same direction as the coil 22 varies as indicated by the solid line in FIG. 7c in the same phase with the control current and the magnetic flux density generated by the coil 22 with reference to the biasing magnetic field having the same absolute value of intensity as the biasing magnetic field generated by the permanent magnet 23, which is generated to bias the magnetostrictive element 31 in a positive direction. In this connection, the magnetic flux density in the vicinity of the coil 22 varies as indicated by the broken line in FIG. 7d, while that in the vicinity of the coil 32 as indicated by the solid line in FIG. 7d.

Thus, the magnetostrictive elements 21, 31 are biased in directions opposite to each other by the biasing magnetic fields having the same absolute value of intensity and generated in directions opposite to each other, and the magnetic fields generated by the coils 22, 32 vary in the same phase as shown in FIG. 7c, so that the elements 21, 31 expand and contract from the predetermined reference positions thereof to which they are resiliently deformed by the biasing magnetic fields, in manners opposite to each other as in the case of the first embodiment. That is, the magnetostrictive element 21 of the upper driving member 2 expands and contracts in the phase opposite to that of the control current supplied to the coil 22 and with amplitude proportional to that of same, as indicated by the broken line in FIG. 7e whereas the magnetostrictive element 31 of the lower driving member 3 contracts and expands in phase identical to that of the control current supplied to the coil 32 and with amplitude proportional to that of same, as indicated by the solid line in FIG. 7e.

Thus, according to the second embodiment, similarly to the first embodiment, the magnetostrictive element 31 of the lower driving member 3 expands and contracts in the same direction and by the same amount as the displacement of the bracket 4 caused by the engine vibration to thereby control the transmission of the engine vibration from the bracket 4 (support means) fixed to the engine (vibration source) to the base 5 fixed to the chassis of the vehicle. Further, the magnetostrictive element 21 of the upper driving member 2 and the magnetostrictive element 31 of the lower driving member 3 expand and contract in such opposite manners as compensates for the expansion and contraction of their counterparts, i.e. in opposite directions to and by the same amount will each other (FIGS. 5a to 5e and FIG. 6), the total length L of the three members of the driving members 2, 3 and the bracket 4 remains constant.

Next, a third embodiment of the invention will be described.

Figure 8:
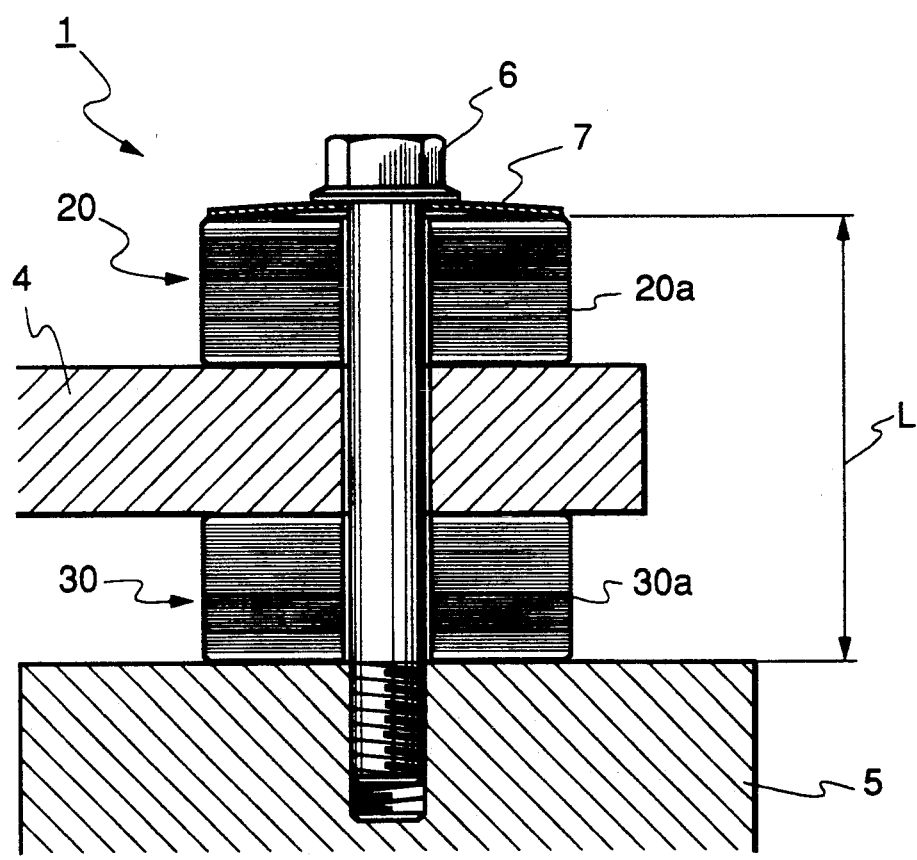
FIG. 8 is a longitudinal cross-sectional view showing a control assembly of a vibration control system according to a third embodiment of the invention.

FIG. 8 shows a vibration control assembly of a vibration control system according to the third embodiment of the invention.

The vibration control assembly shown in FIG. 8 comprises a pair of driving members 20, 30 each formed of a laminate of electrostrictive elements (hereinafter referred to as "the electrostrictive laminate") 20a, 30a. The driving members 20, 30 are arranged in such a manner that they hold therebetween the bracket (support means) 4 fixed to the engine, and at the same time, the lower one 30 is interposed between the bracket 4 and the base 5 fixed to the chassis of the vehicle. The driving members 20, 30 have their electrostrictive laminates 20a, 30a supplied with the same amount of biasing electric charge from a charge control circuit 80, described hereinafter. The amount of biasing electric charge is set to such a value as will deform each of the electrostrictive laminates 20a, 30a to approximately half of the maximum elastic deformation (the maximum elongation). The electrostrictive laminates 20a, 30a are additionally supplied with control voltages, as control signals, which are opposite in phase and equal to each other in the absolute value thereof, from the charge control circuit 80, whereby the electrostrictive laminates 20a, 30a expand and contract according to the control voltages in opposite manners and to degrees compensating for the amount of deformation of their counterparts from predetermined reference positions thereof to which they are normally biased by the biasing electric charge, respectively.

Figure 9:
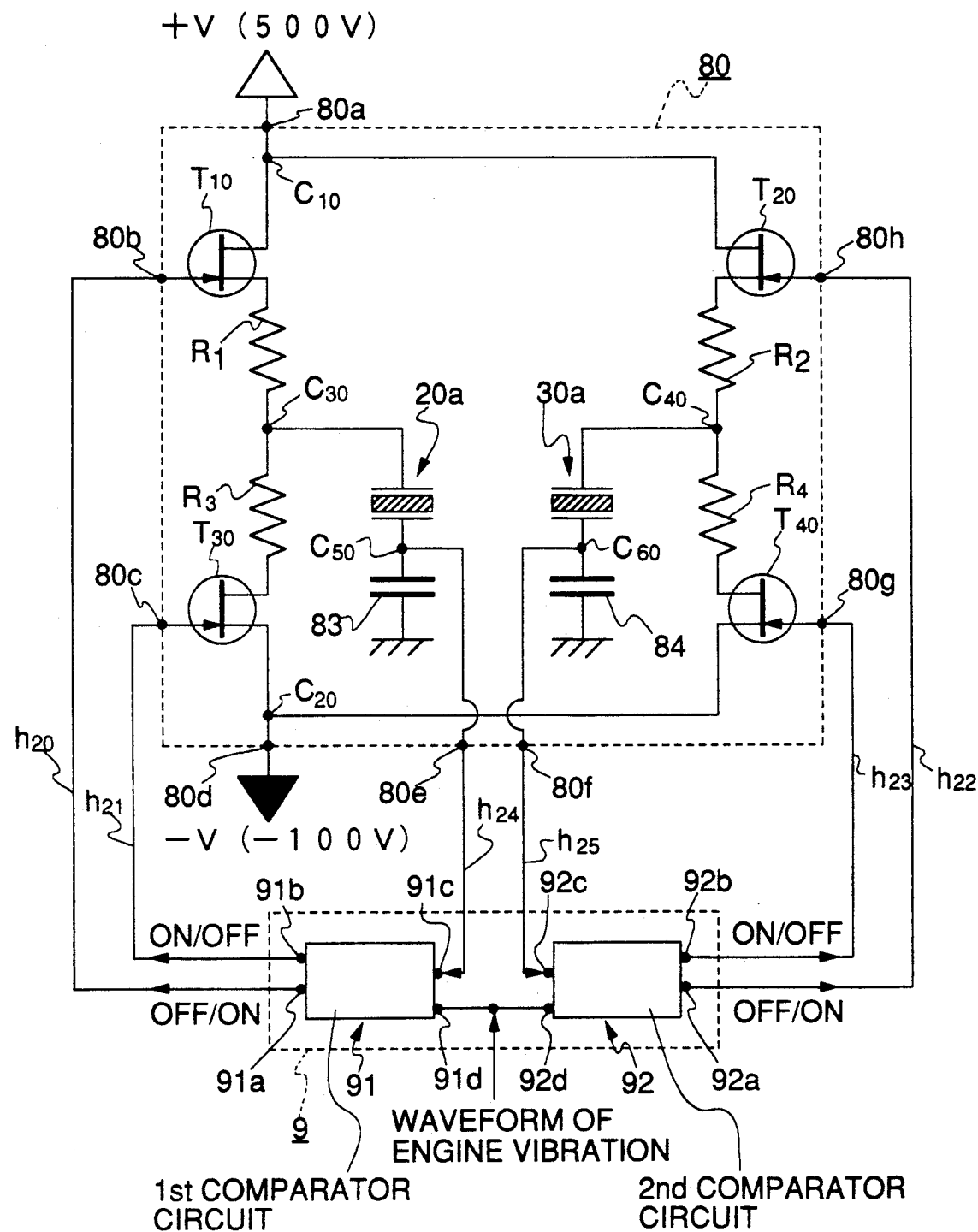
FIG. 9 is a circuit diagram showing an electric charge control circuit and a controller used in the vibration control assembly according to the third embodiment.

FIG. 9 shows details of the charge control circuit 80, which normally supplies the biasing electric charges to the electrostrictive laminates 20a, 30a, and additionally applies the control voltages thereto to thereby control the electric charges held thereon. The charge control circuit 80 is controlled by the controller 9.

As shown in FIG. 9, the charge control circuit 80 comprises four switching transistors $T_{10}$, $T_{20}$, $T_{30}$, and $T_{40}$, two charging resistances $R_1$, $R_2$, two discharging resistances $R_3$, $R_4$, charge-monitoring capacitors 83, 84 for monitoring the electric charges held by the electrostrictive laminates 20a, 30a, and external terminals 80a to 80h. The transistors $T_{10}$, $T_{20}$ have their sources connected to each other at a junction C10, which in turn is connected via the external terminal 80a to the positive side of the storage battery carried by the vehicle, specifically, the output side of a positive power source which supplies an output voltage of approximately 500 V obtained by boosting the supply voltage of the storage battery. The transistors $T_{30}$, $T_{40}$ have their drains connected to each other at a junction $C_{20}$, which in turn is connected via the external terminal 80d to the negative side of the storage battery, specifically, the output side a negative power source which supplies an output voltage of −100 V obtained by dropping the supply voltage of the storage battery. The transistor $T_{10}$, the resistance $R_1$, the resistance $R_3$, and the transistor $T_{30}$ are connected in series between the positive side and the negative side of the storage battery, while the transistor $T_{20}$, the resistance $R_2$, the resistance $R_4$, and the transistor $T_{40}$ are connected in series therebetween. The electrostrictive laminate 20a and the capacitor 83 are serially connected, while the electrostrictive laminate 30a and the capacitor 84 are serially connected. The electrostrictive laminate 20a has one end thereof connected to a junction $C_{30}$ of the resistance $R_1$ with the resistance $R_3$, while the electrostrictive element 30a has one end thereof connected to a junction $C_{40}$ of the resistance $R_2$ with the resistance $R_4$. The capacitors 83, 84 have respective one ends thereof grounded. The transistors $T_{10}$, $T_{30}$ have their respective gates connected via the external terminals 80b, 80c, lines $h_{20}$, $h_{21}$, and both via the output circuit, not shown, of the controller 9 to output terminals 91a, 91b of a first comparator circuit 91. The transistors $T_{20}$, $T_{40}$ have their respective gates connected via the external terminals 80h, 80g, lines $h_{22}$, $h_{23}$, and both via the output circuit, not shown, of the controller 9 to output terminals 92a, 92b of a second comparator circuit 92. Further, a junction $C_{50}$ of the electrostrictive laminate 20a with the capacitor 83 is connected via the external terminal 80e, a line $h_{24}$ and the input circuit of the controller 9 to an input terminal 91c of the first comparator circuit 91, while a junction $C_{60}$ of the electrostrictive laminate 30a with the capacitor 84 is connected via the external terminal 80f, a line $h_{25}$ and the input circuit of the controller 9 to an input terminal 92c of the second comparator circuit 92.

The input terminals 91d, 92d of the first and second comparator circuits 91, 92 are supplied with a reference signal indicative of the waveform of the engine vibration (FIG. 10a), which is synchronous with the rotation of the engine, via an input circuit, not shown, of the controller 9. Responsive to the reference signal, the comparator circuits 91 and 92 output ON-OFF pulse signals in the following manner: Since the electrostrictive laminates 20a, 30a are displaced from the respective reference positions thereof by amounts proportional in proportion to the varying amounts of electric charges held by them, the amounts of electric charge stored in the charge-monitoring capacitors 83, 84, which are equal to those held by the electrostrictive laminates 20a, 30a, are calculated based on potentials at the junctions $C_{50}$, $C_{60}$ detected via the line lines $h_{24}$, $h_{25}$, respectively. Based on the varying amounts of electric charges stored in the capacitors, the control voltages (FIG. 10b) are calculated, and then the phase and amplitude of each of the waveforms of the control voltages are compared with the phase and amplitude of the waveform of the reference signal, whereby the ON-OFF pulse signals are supplied from the comparator circuits 91 and 92 via the output terminals 91a, 91b, 92a, 92b, and PWM control is effected by the transistors $T_1$ to $T_4$ according to the widths of the ON-OFF pulse signals, so as to make the waveform of the control voltage applied to the electrostrictive laminate 30a equal to the waveform of the reference signal and that of the control voltage applied to the electrostrictive laminate 20a opposite in phase to that of the reference signal. As the pulse durations of the pulse signals from the output terminals 91a, 92b of the comparator circuits 91, 92 increase, the electrostrictive laminates 20a, 30a are charged with larger amounts of electricity to increase the electric charges held thereby, whereas as the pulse durations of the pulse signals from the output terminals from the output terminals 91b, 92b increase, the electrostrictive laminates discharge larger amounts of electricity to decrease the electric charges held thereby.

Further, the comparator circuits 91, 92 output other ON-OFF pulse signals via the respective output terminals 91a, 91b, 92a, 92b, to make the electric charges of the electrostrictive laminates equal to the above-mentioned biasing electric charges. When the electric charges held by the electrostrictive laminates 20a, 30a become equal to the biasing electric charges, all the four transistors $T_{10}$, $T_{20}$, $T_{30}$ and $T_{40}$ are turned off, to thereby maintain the biasing electric charges held by the electrostrictive laminates.

Thus, the transistors $T_{10}$ to $T_{40}$ of the charge control circuit 80 carry out PWM control in response to the ON-OFF pulse signals from the comparator circuits 91, 92, to allow the charge control circuit 80 to supply a control voltage indicated by the broken line in FIG. 10b, which is in opposite phase to the waveform of the engine vibration and with the same amplitude therewith, to the electrostrictive laminate 20a of the upper driving member 20, and a control voltage indicated by the solid line in the figure, which is in the same phase to the waveform of the engine vibration and with the same amplitude therewith, to the electrostrictive laminate 30a of the lower driving member 30.

Next, the operation of the vibration control system constructed as above will be described:

When the input terminals 91d, 92d of the comparator circuits 91, 92 of the controller 9 are supplied with the reference signal indicative of the waveform of the engine vibration as shown in FIG. 10a, the charge control circuit 80 applies the control voltage as indicated by the broken line in FIG. 10b to the electrostrictive laminate 20a of the upper driving member 20, and the control voltage as indicated by the solid line in FIG. 10c to the electrostrictive laminate 30a of the lower driving member 30.

Upon application of the control voltages to the electrostrictive laminates 20a, 30a, the electric charge stored in the electrostrictive laminate 20a of the upper driving member 20 varies as indicated by the broken line in FIG. 10c, while the electric charge stored in the electrostrictive laminate 30a of the lower driving member 30 varies as indicated by the solid line in the figure. Accordingly, the electrostrictive laminate 20a expands and contracts in phase opposite to and with amplitude commensurate with that of the control voltage applied thereto, as indicated by the broken line in FIG. 10d, whereas the electrostrictive laminate 30a expands and contracts in phase identical to and with amplitude commensurate with that of the control voltage applied thereto, as indicated by the solid line in FIG. 10d. In short, the electrostrictive laminate 30a of the lower driving member 30 arranged between the bracket 4 and base 5 expands and contracts in the same direction and by the same amount as the displacement of the bracket caused by the engine vibration, whereas the electrostrictive laminates 20a of the upper driving member 20 expands and contracts in manners opposite to the electrostrictive laminate 30a of the lower driving member 30.

The electrostrictive laminate 30a of the lower driving member 30 expands and contracts in the same direction and by the same amount as the displacement of the bracket 4 caused by the engine vibration, similarly to the magnetostrictive element 31 of the first embodiment, in other words, the electrostrictive laminate 30a expands as the distance between the bracket 4 and the base 5 increases due to upward displacement of the bracket 4, and the laminate 30a contracts as the above distance decreases due to downward displacement of the bracket 4, to thereby prevent the engine vibration from being transmitted from the bracket 4 (support means) fixed to the engine (vibration source) to the base 5 fixed to the chassis of the vehicle.

Further, according to the present embodiment, similarly to the first embodiment, the electrostrictive laminate 20a of the upper driving member 20 and the magnetostrictive laminate 30a of the lower driving member 30 expand and contract in the opposite manners and to the same degree so as to compensate for expansion and contraction of their counterparts. That is, when the electrostrictive element 30a expands, the magnetostrictive element 20a contracts to a degree matching the degree of expansion of the element 30a, whereas when the former element 30a contracts, the latter element 20a expands to a degree matching the degree of contraction of the former element 30a. As a result, the total length L of the three members, i.e. the driving members 20, 30 and the bracket 4 remains constant, which prevents the dished spring 7 and the bolt 6 from being exposed to repeated application of load. Therefore, it is possible to avoid loosening of the bolt 6 or breakage thereof due to fatigue, prolonging the life thereof, and hence positively hold the engine (vibration source) on the chassis of the vehicle. The fastening force of the bolt 6 is set to a value just sufficient to apply a compressive force to the electrostrictive laminates 20a, 30a, and at the same time, the aforementioned total length L is constant, so that the displacement of the electrostrictive laminates 20a, 30a are not restricted by the compressive force, so that electrostrictive laminates 20a, 30a of the driving members 20, 30 can expand and contract in the opposite manners without being adversely affected by the compressive force, in response to the control voltages applied thereto. This enables positive and accurate control of the transmission of the engine vibration from the bracket 4 to the base 5.

Next, a fourth embodiment and variations thereof will be described with reference to FIGS. 11 to 17.

In FIGS. 11 to 17, identical or corresponding elements and parts are designated by identical reference numerals.

Figure 11:
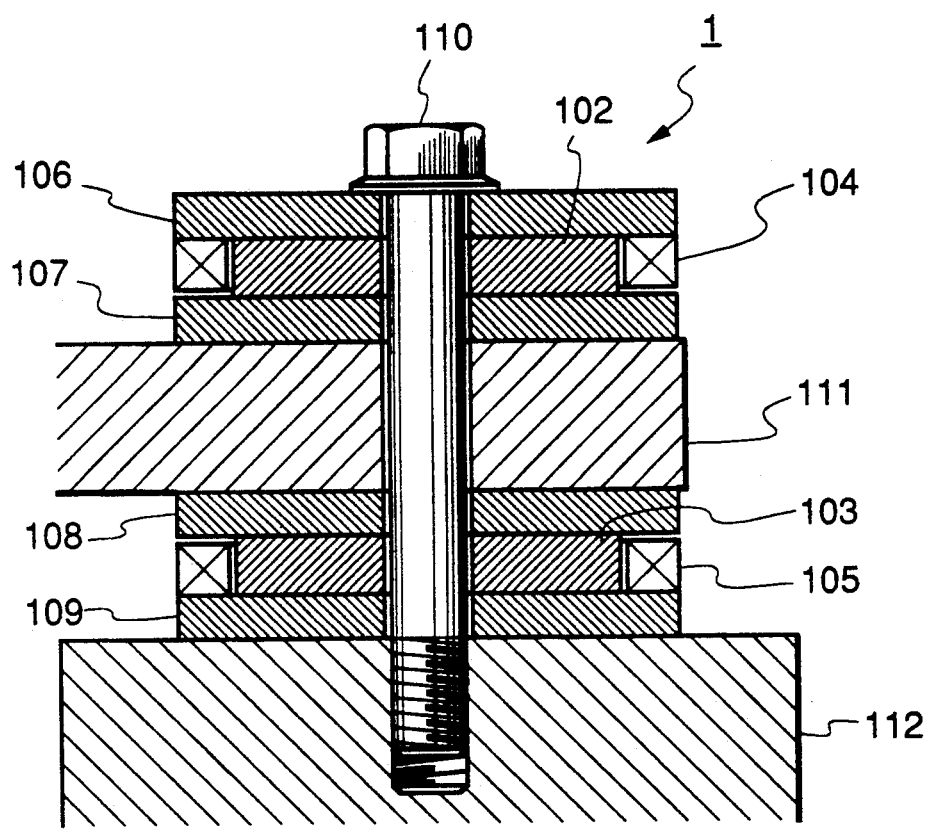
FIG. 11 is a longitudinal cross-sectional view showing a vibration control assembly of a vibration control system according to a fourth embodiment of the invention.

FIG. 11 shows a vibration control assembly 1 of a vibration control system according to the fourth embodiment, which is also embodied as an engine mount.

The vibration control assembly 1 comprises a pair of driving members 102, 103 each formed of negative-magnetostrictive elements having a characteristic that they contract when they are placed in a magnetic field, coils 104, 105 wound around the negative-magnetostrictive elements 102, 103, for generating magnetic fields in which the negative-magnetostrictive elements 102, 103 are placed, magnetic members 106 to 109, and a bolt (fastening member) 110.

The negative-magnetostrictive elements 102, 103 (hereinafter respectively referred to as "the upper driving member 102" and "the lower driving member 103") are arranged such that they hold therebetween a bracket (support means) 111 fixed to the engine, and the lower driving member 103 is located between the bracket 104 and a base 112 fixed to the chassis of the vehicle. The magnetic members 106 and 107 are arranged on the upper and lower end faces of the upper driving member 102, and the magnetic members 108 and 109 are arranged on the upper and lower end faces of the lower driving member 103, respectively. The upper and lower driving members 102, 103 and the bracket 104 are secured to the base 112 by a bolt (fastening means) 6 extending through the members 102, 103 and the bracket 104 for supporting the engine.

The negative-magnetostrictive elements, i.e. the driving members 102, 103 are made of a metallic material having a small Young's modulus. For example, assuming that the fastening force of the bolt 110 is several tens of thousands N (newton), and pressure (compressive force) acting on the driving member per unit area is several thousands N, the driving members 102, 103 are deformed by several hundreds to one thousand and several hundreds PPM.

Figure 12:
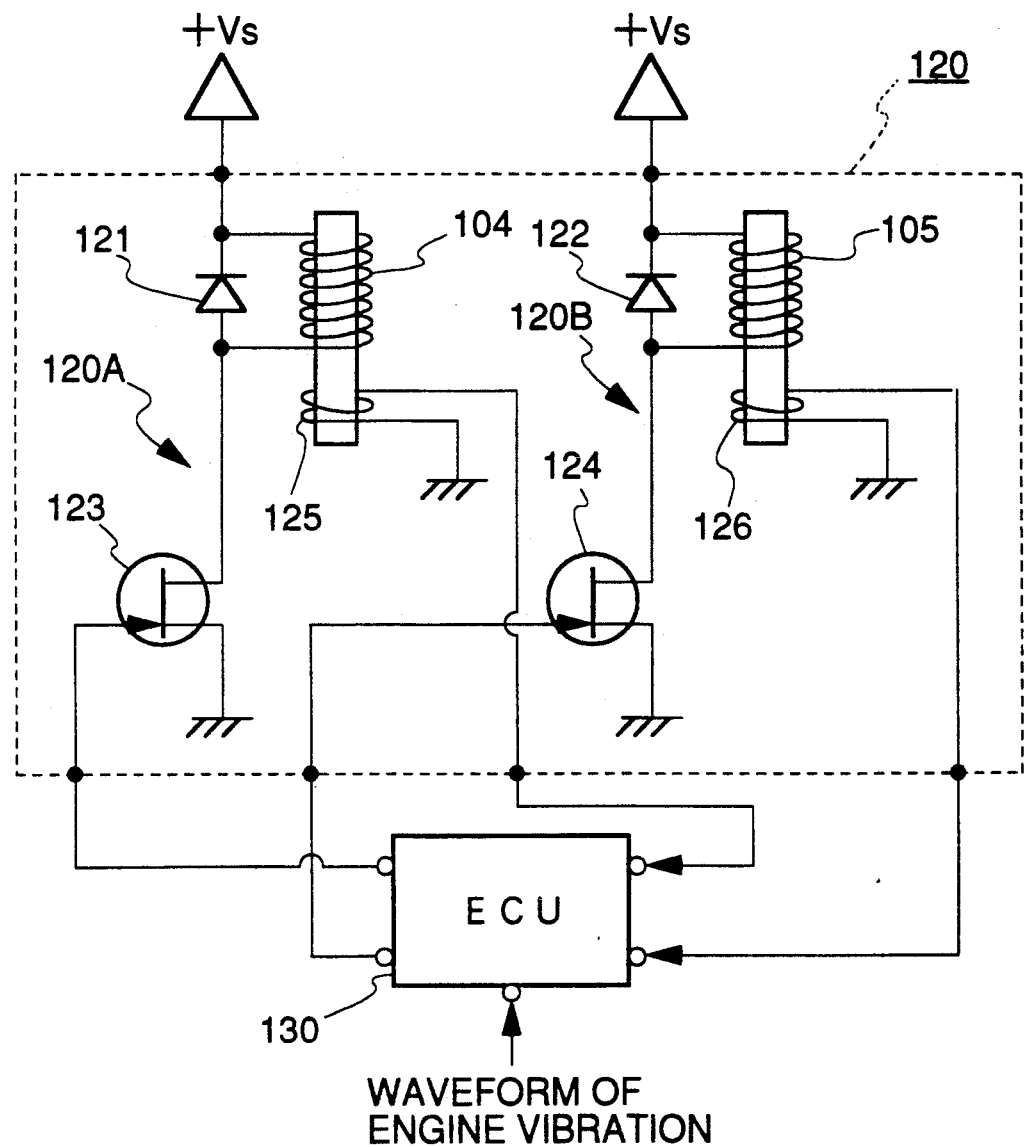
FIG. 12 is a circuit diagram showing a power supply for supplying a control current to coils appearing in FIG. 11, and an electronic control unit for controlling the supply of the control current to the coils.
Figure 13A:
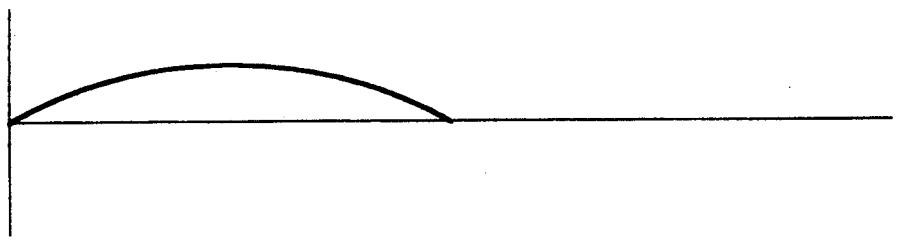
Figure 13B:
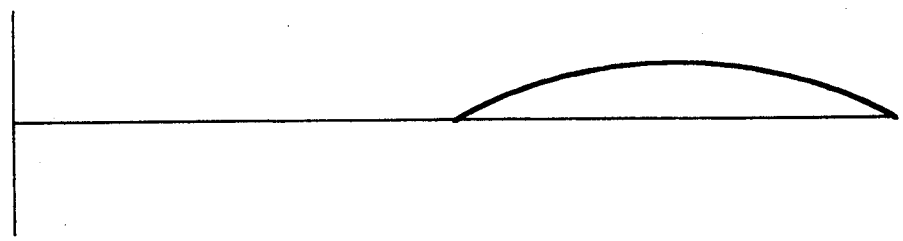
Figure 14A:
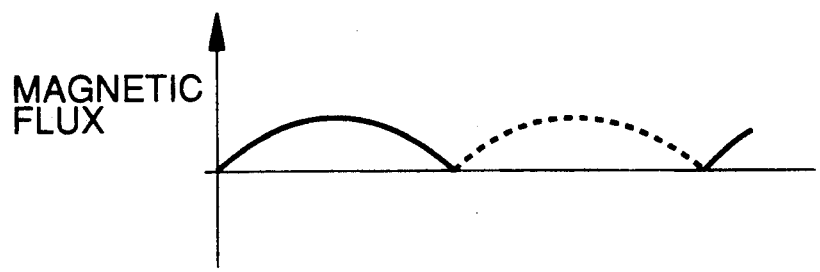
Figure 14B:
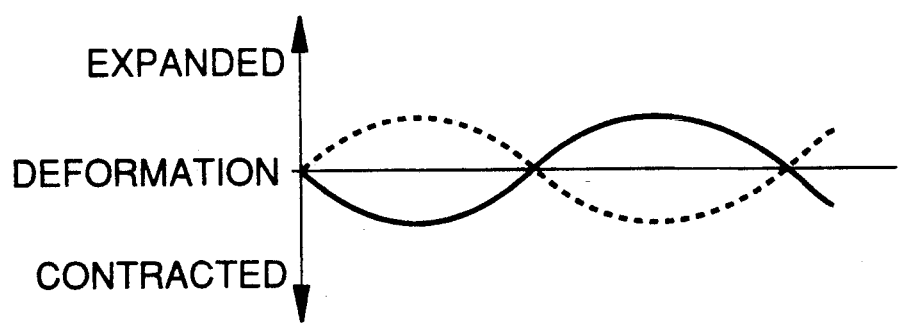

The coils 104, 105 are supplied with control currents as shown in FIGS. 13a, 13b from a common power supply 120 appearing in FIG. 12. More specifically, the power supply 120 is controlled by an electronic control unit (hereinafter referred to as "the ECU") 130 in response to the waveform of engine vibration detected thereby such that control current as shown in FIG. 13a is supplied to the upper driving member 102 and control current as shown in FIG. 13b is supplied to the lower driving member 103, in an alternating manner per each cycle of the waveform of the engine vibration.

As shown in FIG. 12, the power supply 120 includes a first power supply circuit 120A and a second power supply circuit 120B. The power supply circuit 120A is comprised of a rectifying element 121, a switching element 123, and a magnetic flux-detecting coil 125 for detecting a magnetic flux generated by the coil 104 and supplying a magnetic flux-indicative signal, and the power supply circuit 120B is comprised of a rectifying element 122, a switching element 124, and a magnetic flux-detecting coil 116 for detecting a magnetic flux generated by the coils 105. The power supply 120 operates such that when the switching element 123 is supplied with a positive pulse (i.e. when a pulse signal supplied thereto is at a high level), it turns on to allow electric current to flow through the coil 104, and when the switching element 124 is supplied with a positive pulse (i.e. when a pulse signal supplied thereto is at a high level), it turns on to allow electric current to flow through the coil 105.

On the other hand, the ECU 130 is supplied with a signal indicative of the waveform of the engine vibration and the magnetic flux-indicative signals from the magnetic flux-detecting coils 125 and 126. The amount of contraction of the driving member 102 is proportional to the magnitude of magnetic flux generated by the coil 104 and that of the driving member 103 is proportional to the magnitude of magnetic flux generated by the coil 105. Therefore, the ECU 130 controls the switching elements 123, 124 such that the magnetic fluxes alternately generated by the coil 104 and the coil 105 cause displacement (expansion and contraction) of the lower driving member 103 having a waveform closer to the waveform of the engine vibration and displacement of the upper driving member 102 having a waveform opposite in phase and identical in amplitude to the waveform of the engine vibration.

Next, the operation of the vibration control system according to the fourth embodiment will be described.

Let it be assumed that the fastening force of the bolt 110 is several tens of thousands N (newton). Then, the upper and lower driving members 102, 103 will be resiliently deformed (i.e. contracted) by several hundreds to one thousand and several hundreds PPM.

With the members 102, 103 in this deformed state, the power supply 120 supplies control current as shown in FIG. 13a to the coil 104 to cause generation of a magnetic field acting on the upper driving member 102, whereupon the upper driving member 102 is further contracted by an additional resilient deformation of several hundreds PPM, and at the same time the lower driving member 103, on which no magnetic field then acts, elongates or expands due to its own resiliency to a degree corresponding to the additional contraction of the upper driving member 102. On this occasion, the coil 104, which is supplied with the control current shown in FIG. 13a, generates the magnetic field of which the magnetic flux varies as indicated by the solid line in FIG. 14a, and the upper driving member 102 is contracted to the maximum degree when the magnetic flux assumes the maximum magnitude.

On the other hand, the power supply 120 supplies control current as shown in FIG. 13b to the coil 105, to cause generation of a magnetic field acting on the lower driving member 103, whereupon the lower driving member 103 is further contracted by an additional resilient deformation of several hundreds PPM, and at the same time the upper driving member 102, on which no magnetic field then acts, elongates or expands due to its own resiliency to a degree corresponding to the additional contraction of the lower driving member 103. On this occasion, the coil 105, which is supplied with the control current shown in FIG. 13b, generates the magnetic field of which the magnetic flux varies as indicated by the broken line in FIG. 14b, and the lower driving member 103 is contracted to the maximum degree when the magnetic flux assumes the maximum magnitude.

Thus, by alternately placing the upper and lower driving members 102, 103 in the magnetic fields, when the upper driving member 102 contracts, the lower driving member 103 expands or elongates, and vice versa, as shown in FIGS. 15a to 15e. This causes the bracket 111 to move up and down, or cause displacement of the bracket 111 relative to the base 112, as indicated by the solid line in FIGS. 15a to 15e, with the total length of the members fastened by the bolt 110 being maintained constant, whereby the engine vibration is suitably controlled. Therefore, by varying the magnetic flux of the magnetic fields alternately acting on the upper and lower driving members 102, 103, respectively, the characteristic of vibration transmission control of the vibration control system can be varied.

Figure 16:
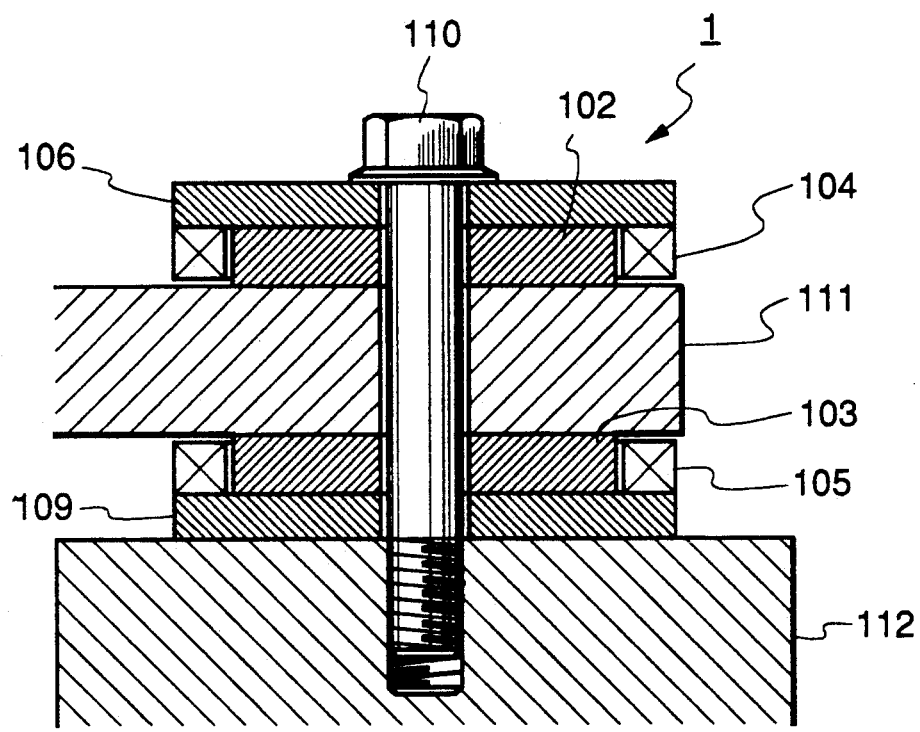
FIG. 16 is a longitudinal cross-sectional view showing a vibration control assembly according to a first variation of the fourth embodiment.

FIG. 16 shows a first variation of the fourth embodiment, in which the magnetic members 107 and 108 appearing in FIG. 11 are replaced by portions of the bracket 111.

The assembly 1 according to this variation is more simplified in construction and reduced in weight than that of the fourth embodiment.

Figure 17:
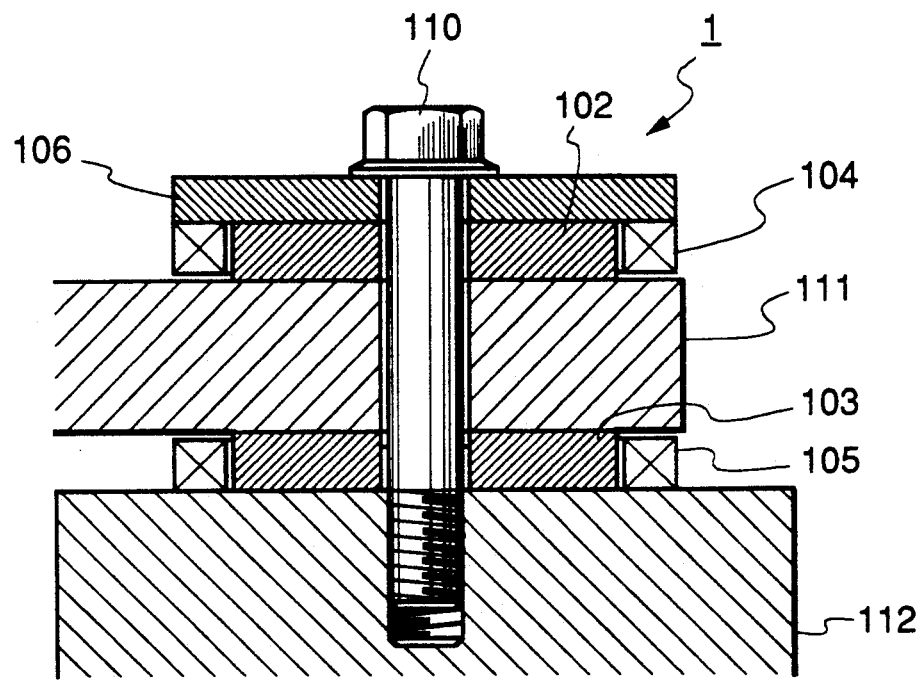
FIG. 17 is a longitudinal cross-sectional view showing a vibration control assembly according to a second variation of the fourth embodiment.

FIG. 17 shows a second variation of the fourth embodiment, in which the magnetic member 109 of the first variation appearing in FIG. 17 is replaced by a portion of the base 112.

The assembly 1 according to this variation is still more simplified in construction and reduced in weight than that of the first variation.

Although in the above described embodiments the lower driving member is deformed or displaced in the same phase with the engine vibration while the upper driving member is deformed or displaced in opposite phase to the engine vibration, this is not limitative, but, for example, it may be so arranged that the lower driving member is deformed or displaced with a suitable phase difference from the engine vibration so as to control the transmission of vibrations from a vibration source in various manners other than shutting-off of transmission of vibrations from the vibration source to a base. For example, the magnitude of vibrations from a vibration source may be controlled to a desired level.

The vibration control system 1 of the invention is not limited in use to an engine mount for controlling the transmission of vibrations from the engine as the vibration source to the chassis of the vehicle, but it may be widely applied as means for controlling the transmission of vibrations from a vibration source other than an engine to a base supporting the vibration source.

Next, the active control of vibration and noise occurring in an automotive vehicle by the use of a vibration control system according to the invention, constructed as above will be described, by way of example, with reference to FIG. 18.

As shown in the figure, the engine E is supported on the chassis 160 of the vehicle, at two locations, by means of two engine mounts each formed by the vibration control system assembly 1 of the vibration control system 1 of the fourth embodiment having a variable vibration transmission control characteristic, and at one location, by means of an ordinary or conventional engine mount 161 having an invariable vibration transmission control characteristic. Further, the engine E is supported by means of a suspension system provided between driving wheels and the chassis 160, as well as by support means 65 supporting an exhaust pipe 164. Vibration sensors 171, 172 are arranged on the floor of the compartment and on a steering wheel, respectively, and a microphone 173 on the ceiling of the compartment.

Figure 18:
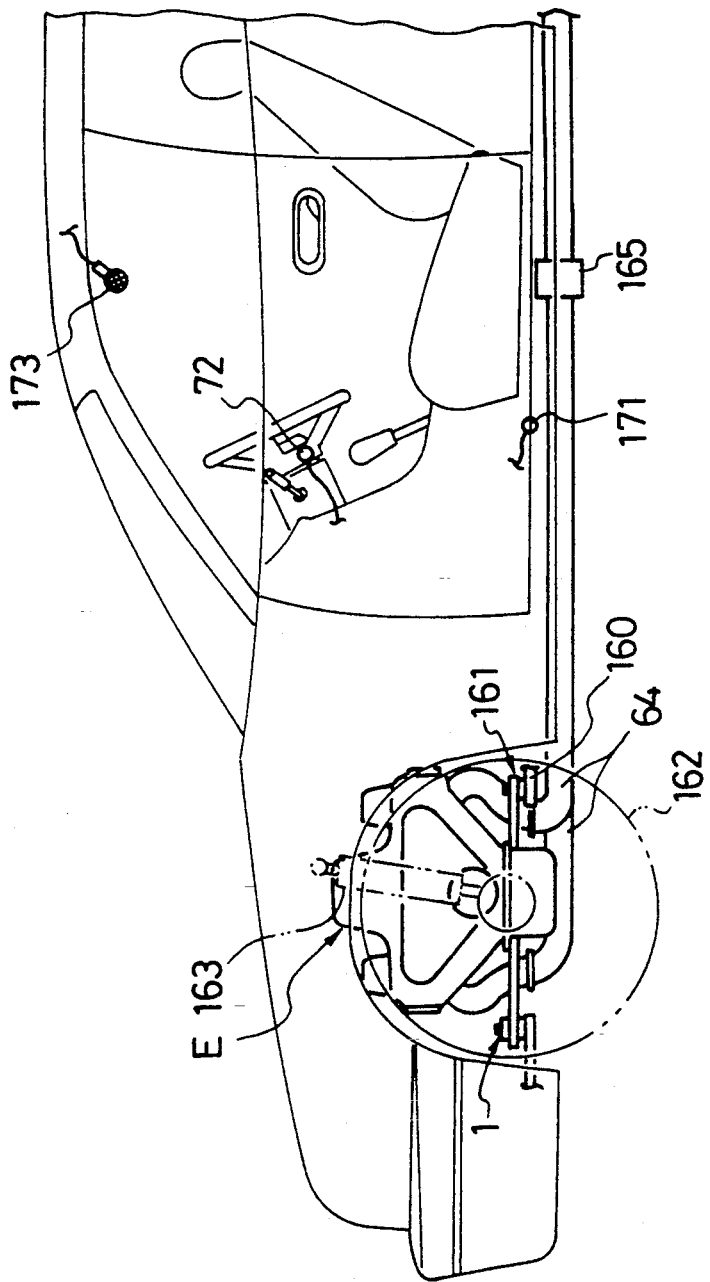
FIG. 18 is a schematic fragmentary view showing an automotive vehicle incorporating a vibration control system according to the invention as an active vibration control system.

The active vibration transmission control system comprises at least one vibration control assembly 1 arranged in at least on vibration-transmitting path through which vibrations are transmitted from the engine or the road surface to the chassis 60 of the vehicle, one example of which is shown in FIG. 18. The vibration transmission control characteristic of the vibration control assembly 1 is varied by the use of at least one adaptive digital filter, not shown, such that the total amount of vibrations or noise transmitted to particular points in the compartment by way of all the vibration-transmitting paths becomes the minimum.

In the example shown in FIG. 18, two vibration control assemblies 1 having a variable vibration transmission control characteristic are arranged in two of the vibration-transmitting paths. According to the system, the vibration transmission control characteristic of the assemblies 1 is varied by the use of adaptive digital filters such that the total amount of vibrations (detected by the vibration sensors 171 and 172) or noise (detected by the microphone 173) transmitted to particular points in the compartment by way of all the vibration-transmitting paths becomes the minimum.

What is claimed is:

1. A vibration control system for controlling transmission of vibrations from a vibration source to a base, the vibration control system comprising:
   a vibration control assembly having:
   support means fixed to said vibration source;
   a pair of driving members holding said support means therebetween and deformable or displaceable in opposite directions and by substantially the same amount in response to at least one control signal corresponding to said vibrations from said vibration source, one of said driving members being arranged between said support means and said base; and
   fastening means securing said support means and said driving members to said base; and
   control means for supplying said control signal to said driving members.

2. A vibration control system according to claim 1, wherein said driving members each comprise a magnetostrictive element, a coil wound around said magnetostrictive element, and a permanent magnet placing said magnetostrictive element in a biasing magnetic field, the direction of winding of said coil of one of said driving members being opposite to that of winding of said coil of the other driving member, the direction of said biasing magnetic field generated by said permanent magnet of said one driving member being opposite to that of said biasing magnetic field generated by said permanent magnet of the other driving member, said control means supplying said coils with control currents having substantially the same magnitude, as said at least one control signal.

3. A vibration control system according to claim 1, wherein said driving members each comprise a magnetostrictive element, a coil wound around said magnetostrictive element, and a permanent magnet placing said magnetostrictive element in a biasing magnetic field, the direction of winding of said coil of one said driving members being identical to that of winding of said coil of the other driving member, the direction of said biasing magnetic field generated by said permanent magnet of said one driving member is identical to that of said biasing magnetic field generated by said permanent magnet of the other driving member, said control means supplying said coils with control currents having substantially the same magnitude as said at least one control signal.

4. A vibration control system according to claim 1, wherein said driving members each comprise an electrostrictive element, said electrostrictive element being supplied with a control voltage as said at least one control signal, said control voltage applied to one of said electrostrictive elements having the same absolute value with and being opposite in phase to said control voltage applied to the other electrostrictive element, said control means previously applying a biasing charge to each of said electrostrictive elements before supplying said control voltage thereto.

5. A vibration control system according to claim 4, wherein said electrostrictive element is formed of a laminate of electrostrictive elements.

6. A vibration control system according to claim 1, wherein said driving members each comprise a negative-magnetostrictive element having a characteristic that is contracts when placed in an magnetic field, a pair of magnetic members holding said negative-magnetostrictive element therebetween, and a coil wound around said negative-magnetostrictive element, said control means supplying said coils with respective control currents, as said at least one control signal, separately from each other.

7. A vibration control system according to claim 6, wherein said coils are alternately supplied with said respective control currents per one cycle of a waveform of said vibrations from said vibration source.

8. A vibration control system according to claim 7, wherein one of said magnetic members is formed by a portion of said support means.

9. A vibration control system according to claim 7 or 8, wherein one of said magnetic members is formed by a portion of said base.

10. A vibration control system according to claim 1, wherein said driving members each include a magnetostrictive element and a coil wound around said magnetostrictive element, said magnetostrictive element being expansible and contractible in response to a magnetic field generated by said coil.

11. A vibration control system according to claim 1, wherein said driving members each include an electrostrictive element expansible and contractible in response to a control voltage applied thereto.

12. A vibration control system according to claim 1, wherein said driving members each include a negative-magnetostrictive and a coil wound around said negative-magnetostrictive elements said negative-magnetostrictive element being only contractible in response to a magnetic field generated by said coil.

* * * * *

UNITED STATES PATENT AND TRADEMARK OFFICE
CERTIFICATE OF CORRECTION

PATENT NO. : 5,275,388

DATED : January 4, 1994

INVENTOR(S) : T. Kobayashi et al.

It is certified that error appears in the above-identified patent and that said Letters Patent is hereby corrected as shown below:

Claim 2, line 10 (column 17, line 68) change "opposite" to -- identical --.

Claim 3, line 10 (column 18, line 14) change "identical" to -- opposite --.

Claim 12, line 4 (column 18, line 65) after "elements" insert a comma -- , --.

Signed and Sealed this

Thirteenth Day of February, 1996

Attest:

BRUCE LEHMAN

*Attesting Officer*   Commissioner of Patents and Trademarks